United States Patent
Kamath et al.

(10) Patent No.: US 10,609,511 B2
(45) Date of Patent: Mar. 31, 2020

(54) TECHNIQUES FOR PROVIDING MEETING LOCATION SUGGESTIONS

(71) Applicant: Facebook, Inc., Menlo Park, CA (US)

(72) Inventors: Prashanth Kamath, Menlo Park, CA (US); Wei Wu, Fremont, CA (US); Francesco Fogu, San Francisco, CA (US); Mingchen Zhao, Foster City, CA (US); Pratap Prabhu, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/835,921

(22) Filed: Dec. 8, 2017

(65) Prior Publication Data

US 2019/0182616 A1 Jun. 13, 2019

(51) Int. Cl.
*H04W 4/02* (2018.01)
*G06F 9/44* (2018.01)
(Continued)

(52) U.S. Cl.
CPC ...... *H04W 4/023* (2013.01); *G06F 16/24578* (2019.01); *G06F 16/904* (2019.01); *G06F 16/9535* (2019.01); *H04L 51/20* (2013.01); *H04L 67/18* (2013.01); *H04L 67/22* (2013.01); *H04L 67/306* (2013.01); *G06F 9/453* (2018.02);
(Continued)

(58) Field of Classification Search
CPC ..... G06F 3/04842; H04L 51/16; H04L 51/02; H04L 51/08; H04L 51/18; H04L 51/20; H04L 67/20; H04M 1/72552; H04M 1/72583; H04N 21/47205; H04N 21/4788; H04W 4/50; H04W 4/025; H04W 4/14
See application file for complete search history.

(56) References Cited

U.S. PATENT DOCUMENTS 9,809,196 B1 * 11/2017 Penilla ................. H04N 7/181
2016/0360336 A1 * 12/2016 Gross .................. H04W 4/025
(Continued)

OTHER PUBLICATIONS

Google Allo—A Smart Messaging App, available on internet at: https://allo.google.com/, accessed from the Internet on Apr. 10, 2018, 11 pages.
(Continued)

*Primary Examiner* — Liton Miah
(74) *Attorney, Agent, or Firm* — Kilpatrick Townsend & Stockton LLP

(57) ABSTRACT

Disclosed herein are techniques for enhancing online or digital platforms by enabling them to intelligently suggest physical meeting locations to one or more users of the platforms. In one embodiment, a method includes detecting an intent of a first user to meet at a physical location based upon messages exchanged between the first user and a second user via a messaging platform, selecting a list of physical locations from a pre-configured list of physical locations based upon information associated with the first user, and causing the list of physical locations to be displayed to the first user. In response to receiving information indicating selection of a first physical location from the list of physical locations from the first user, information identifying the first physical location can be displayed to the second user for the second user to accept or reject the first physical location.

18 Claims, 19 Drawing Sheets

(51) Int. Cl.
*H04L 12/58* (2006.01)
*H04L 29/08* (2006.01)
*G06F 16/904* (2019.01)
*G06F 16/9535* (2019.01)
*G06F 16/2457* (2019.01)
*G06Q 50/00* (2012.01)
*G06F 9/451* (2018.01)
*H04W 4/12* (2009.01)
*H04W 4/21* (2018.01)

(52) U.S. Cl.
CPC ............... *G06Q 50/01* (2013.01); *H04W 4/12* (2013.01); *H04W 4/21* (2018.02)

(56) References Cited

U.S. PATENT DOCUMENTS

| | | | | |
|---|---|---|---|---|
| 2017/0180276 A1* | 6/2017 | Gershony | ............... | H04L 51/02 |
| 2017/0180294 A1* | 6/2017 | Milligan | ................ | H04L 51/16 |
| 2017/0256265 A1* | 9/2017 | Lee | ....................... | G10L 17/005 |
| 2018/0183619 A1* | 6/2018 | Jayaram | ................ | H04L 51/16 |
| 2018/0365732 A1* | 12/2018 | Hampson | ........... | G06Q 30/0261 |

OTHER PUBLICATIONS

Google Allo Help—Google Support, available on Internet at: https://support.google.com/allo/?hI=en, accessed from the Internet on Apr. 9, 2018, 7 pages.

* cited by examiner

440

640
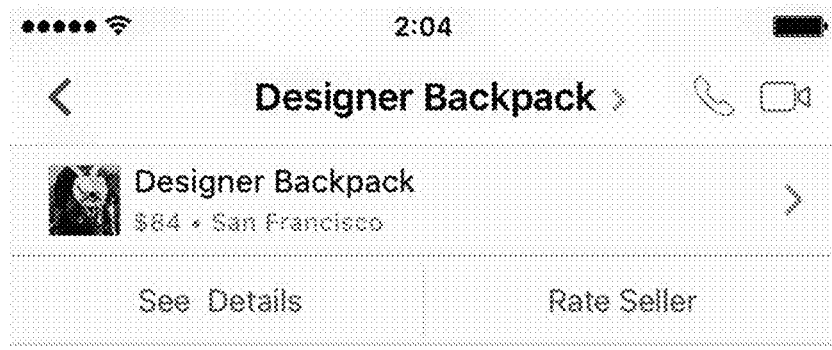
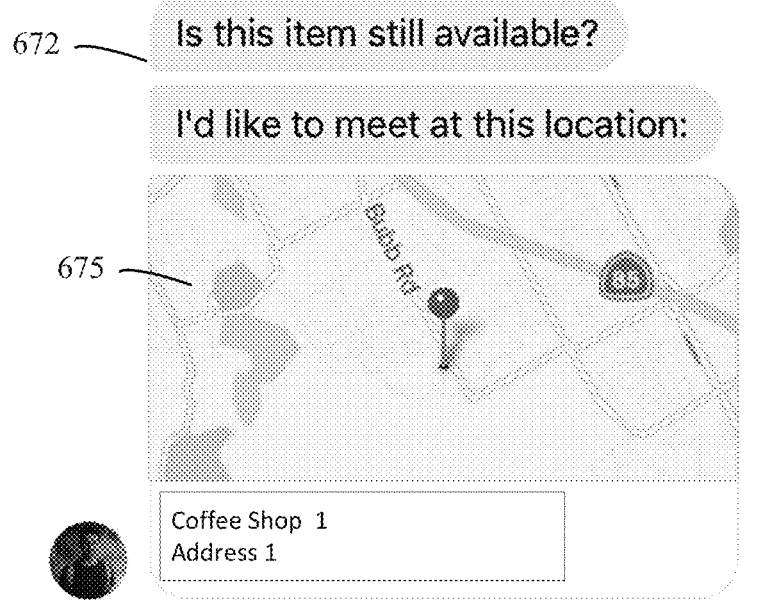
FIG. 6D

TECHNIQUES FOR PROVIDING MEETING LOCATION SUGGESTIONS

BACKGROUND

With the proliferation of mobile devices, several digital platforms are provided that enable people to interact and communicate with each other. For example, a messaging platform may enable two or more of its users to start a conversation using the messaging platform. While such virtual messaging platforms enable remotely located people to "meet" and communicate with each other virtually, these platforms are handicapped when it comes to facilitating in-person meetings at physical locations rather than in virtual places.

People communicating via a messaging platform may want to meet in physical locations for various purposes. For example, two users engaged in a conversation via a messaging platform may want to meet at a physical location to exchange goods or services, for example, as part of a buying/selling transaction. In some scenarios, the messaging platform may be part of on online marketplace that enables sellers to sell products or services online and for buyers to purchases these products or services. For example, using the online marketplace, a buyer and a seller may decide to enter into a sale transaction for a product and may want to meet at a physical location where the seller can deliver the product to the buyer. As another example, a couple of friends or relatives may want to meet socially at a physical location. Current digital platforms fail to properly facilitate such physical meetings.

SUMMARY

The present disclosure relates generally to techniques for enhancing online or digital platforms by enabling them to intelligently suggest physical meeting locations to one or more users of the online or digital platforms. Techniques disclosed herein may be used to suggest meeting locations to two or more users of an online or digital platform, such as two or more users engaged in a conversation via a messaging platform. The techniques disclosed herein may also be used by one user of an online or digital platform (e.g., a peer-to-peer trading platform) to select a physical location for a meeting before or without engaging in a conversation with another user.

Various inventive embodiments are described herein, including methods, systems, non-transitory computer-readable storage media storing programs, code, or instructions executable by one or more processors, and the like. In certain embodiments, techniques disclosed herein may be used by a computing system (e.g., a server) to monitor messages exchanged between two or more users of a messaging platform, detect an intent of at least one of the users to meet at a physical location, and suggest a list of one or more physical locations for the meeting to the user(s) based on information associated with the user(s) and a pre-configured list of physical locations. A user may select a particular location from the suggested list, and information identifying the selected particular location (e.g., a map including the physical location) may be presented to one or more other users.

In some implementations, the pre-configured list of physical locations may be provided by the provider of the messaging platform, and may meet certain criteria, such as certain safety requirements. The pre-configured list of physical locations may be determined based on, for example, past selection history, user feedback, information for accessing the locations, and safety information associated with the locations. In this way, the list of suggested physical locations may be presented to the user automatically to save time for the users, and thus may expedite transactions between users. Moreover, the list of suggested physical locations that is determined based on the information associated with the user (e.g., user preferences and the location of the user) and the pre-configured list of physical locations may have more preferable safety, convenience, and comfort for the users than physical locations determined or provided using, for example, a third-party searching tool or a map service, or a physical location not in the pre-configured list of physical locations.

In certain embodiments, a method that can be performed by a computing system is disclosed. The method may include monitoring a set of one or more messages exchanged between a first user and a second user via a messaging platform, and detecting an intent of the first user to meet at a physical location based upon the monitoring. The method may also include generating a list of one or more physical locations by selecting the one or more physical locations from a pre-configured list of physical locations based upon information associated with the first user, and causing the list of one or more physical locations to be displayed on a first device used by the first user. The method may further include receiving information indicating selection of a first physical location from the list of one or more physical locations from the first device, and causing information identifying the first physical location to be displayed on a second device used by the second user for the second user to accept or reject the first physical location.

In some embodiments of the method, the pre-configured list of physical locations may be provided by a provider of the messaging platform. In some embodiments, the pre-configured list of physical locations may be selected from a set of physical locations based upon at least one of past selections of physical locations from the set of physical locations by one or more users, feedback associated with the set of physical locations from one or more users, ease of access information associated with each of the set of physical locations, or safety information associated with each of the set of physical locations.

In some embodiments of the method, the information associated with the first user may include at least one of a physical location of the first user, or a set of one or more preferences associated with the first user. In some embodiments, the physical location of the first user may include a current location of the first user determined from the first device, or a physical location associated with the first user and stored in the messaging platform. In some embodiments, the set of one or more preferences associated with the first user may include at least one of a physical location associated with the first user, a category of physical locations associated with the first user, a time to meet associated with the first user, or a selection criteria associated with the first user.

In some embodiments of the method, generating the list of one or more physical locations may include causing a meeting location selector to be displayed in an area adjacent to the one or more messages on the first device, and receiving from the first device information indicating selection of the meeting location selector. In response to receiving the information indicating selection of the meeting location selector, the computing system may access the information associated with the first user, access the pre-configured list of physical locations, and select the list of one or more physical locations from the pre-configured list of physical locations based upon the information associated with the first user.

In some embodiments of the method, generating the list of one or more physical locations may further include generating the list of one or more physical locations based upon at least one of a content of the set of one or more messages or a relationship between the first user and the second user. In some implementations, the relationship between the first user and the second user may be determined based upon a social graph stored by a social networking system, where the social graph may include the first user and the second user and identify the relationship between the first user and the second user. In some embodiments, generating the list of one or more physical locations may include generating the list of one or more physical locations based upon at least one of a physical location of the second user or a set of one or more preferences associated with the second user.

In some embodiments of the method, generating the list of one or more physical locations may include ranking the one or more physical locations based upon one or more ranking factors. The one or more ranking factors may include at least one of past selections of physical locations by the first user, distance information associated with each physical location in the list of one or more physical locations relative to a physical location of the first user, ease of access information associated with each physical location in the list of one or more physical locations, or safety information associated with each physical location in the list of one or more physical locations.

In some embodiments, the method may further include receiving from the second device a response indicating acceptance of the first physical location, and sending to the first device a message indicating acceptance of the first physical location by the second user. In some embodiments, the method may further include scheduling a meeting between the first user and the second user at the first physical location.

In some embodiments, the method may further include receiving from the second device a response indicating rejection of the first physical location. In response to receiving the response, the computing system may generate a new list of one or more physical locations excluding the first physical location. The computing system may then cause the new list of one or more physical locations to be displayed to the first device for the first user to select a second physical location, or cause the new list of one or more physical locations to be displayed to the second device for the second user to select the second physical location.

According to certain embodiments, a method that can be performed by a computing system may include receiving a request from a first user, creating a data object associated with the request in response to receiving the request, accessing information associated with the first user from one or more data stores, accessing a pre-configured list of physical locations from the one or more data stores, and generating a list of one or more physical locations by selecting the one or more physical locations from the pre-configured list of physical locations based upon information associated with the first user. The method may also include communicating the list of one or more physical locations to a first device used by the first user, receiving information indicating selection of a first physical location from the list of one or more physical locations from the first device, and storing an association between information indicative of the first physical location and the data object. In some embodiments, the information associated with the first user may include at least one of a physical location of the first user, or a set of one or more preferences associated with the first user.

In some embodiments, the method may further include causing the information indicative of the first physical location to be displayed on a second device used by a second user for the second user to accept or reject the first physical location, receiving a response indicating acceptance of the first physical location from the second device, and sending a message indicating acceptance of the first physical location by the second user to the first device.

In some embodiments, the method may also include causing information identifying two or more physical locations from the list of one or more physical locations to be displayed on a second device used by a second user (where the two or more physical locations include the first physical location), receiving a response indicating a selection of a second physical location from the two or more physical locations from the second device, and sending a message indicating selection of the second physical location by the second user to the first device.

According to certain embodiments, a non-transitory computer-readable storage medium storing instructions executable by one or more processors is disclosed. The instructions, when executed by the one or more processors, may cause the one or more processors to perform operations including monitoring a set of one or more messages exchanged between a first user and a second user via a messaging platform, and detecting an intent of the first user to meet at a physical location based upon the monitoring. The instructions may also cause the one or more processors to perform operations including generating a list of one or more physical locations by selecting the one or more physical locations from a pre-configured list of physical locations based upon information associated with the first user, and causing the list of one or more physical locations to be displayed on a first device used by the first user. The instructions may further cause the one or more processors to perform operations including receiving information indicating selection of a first physical location from the list of one or more physical locations from the first device, and causing information identifying the first physical location to be displayed on a second device used by a second user for the second user to accept or reject the first physical location.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIGS. 6A-6D illustrate example display contents of a user device used by a seller of an item or service, according to certain embodiments;

FIGS. 7A-7D illustrate example display contents of a user device used by a potential buyer of an item or service, according to certain embodiments.

DETAILED DESCRIPTION

Figure 1:
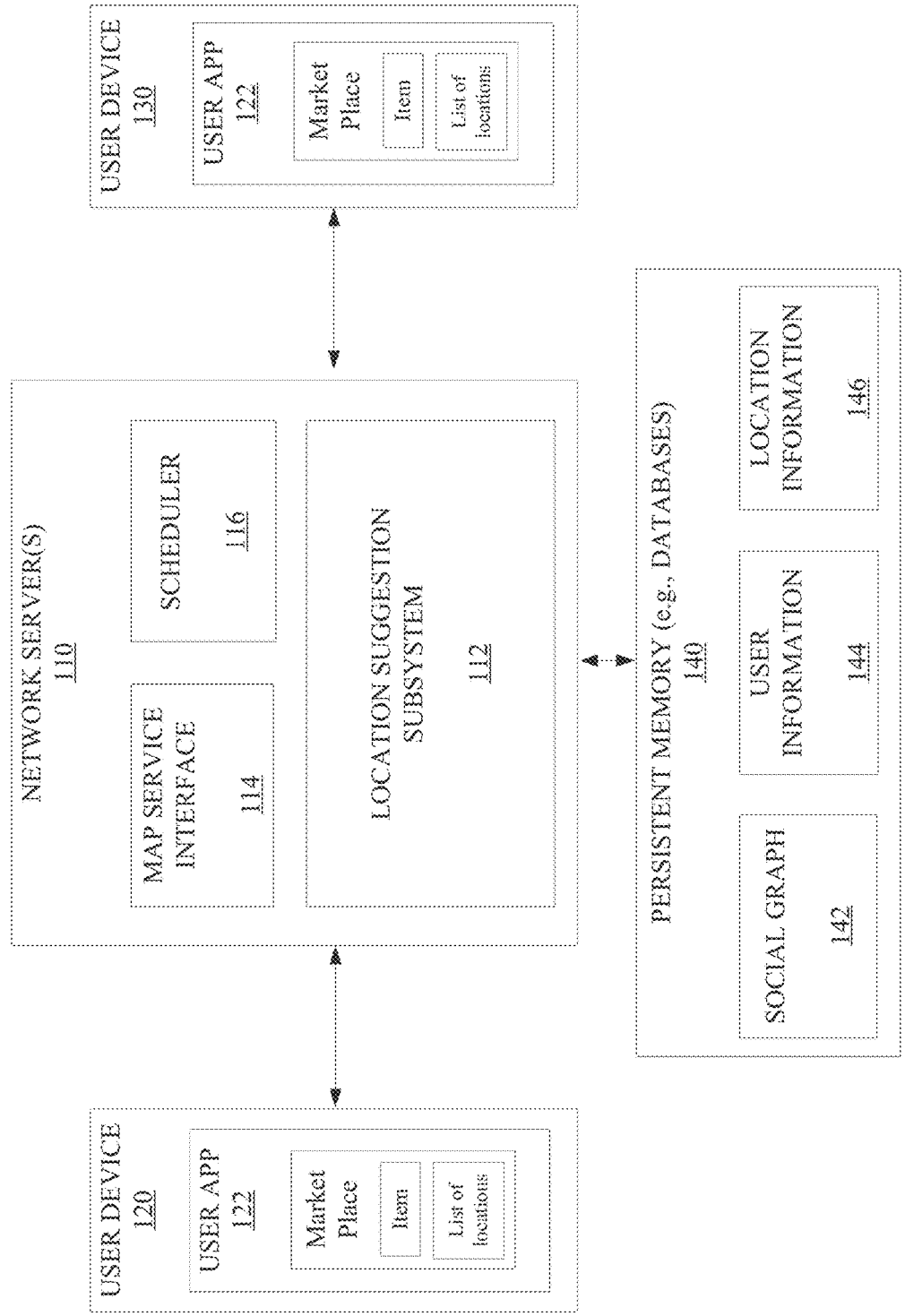
FIG. 1 is a simplified block diagram of an example system that may enable suggesting meeting locations to users, according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "example" is not necessarily to be construed as preferred or advantageous over other embodiments or designs.

The present disclosure relates generally to techniques for enhancing online or digital platforms by enabling them to intelligently suggest physical meeting locations to one or more users of the online or digital platforms.

For example, techniques disclosed herein may be used by an online or digital platform, such as a server of a messaging platform, to monitor messages exchanged between two or more users of the messaging platform, and to detect, based upon the monitoring, an intent of at least one of the two or more users to meet at a physical location. For example, the messaging platform may be part of an online marketplace that provides a digital platform enabling its users to sell and buy goods and/or services. Upon detecting such an intent, the server may determine and provide a list of one or more suggested physical locations for the meeting to one or both of the users thereby enabling the users to select and agree upon a particular physical meeting location to meet from the provided list.

Various different computational techniques may be used to determine the list of physical locations that are suggested to a user. In certain embodiments, the list determined and presented to a user may be based upon information associated with that user and a pre-configured list of physical locations. In some implementations, the pre-configured list of physical locations may be provided by a provider of the messaging platform. In some implementations, the pre-configured list may be a curated list provided by a third party associated with the provider of the messaging platform. For example, the third party may be a cloud service provider providing a physical meeting locations management service to one or more subscribers, where the subscribers may include providers of online or digital platforms, such as providers of messaging platforms, online marketplaces, etc.

In some implementations, the pre-configured list of physical locations may be determined based on various different criteria, such as, without limitation, past selection history by users of the online or digital platforms from a set of physical locations, user feedback regarding the set of physical locations, information associated with accessing the locations (e.g., directions or available public transportations), safety information associated with the set of physical locations such as whether the locations meet certain safety criteria (e.g., safety requirements), and the like.

In certain embodiments, after a list of suggested physical locations is determined from the pre-configured list of physical locations and presented to a user, the user may then select a particular location from the list of suggested physical locations. Information associated with the selected particular location (e.g., address of the physical location, a map including the physical location) may be presented to the other user (or users) for the other user to accept (or alternatively, reject). If the other user accepts, then a message may be sent to both users confirming the acceptance of the particular physical meeting location. In certain embodiments, one or more additional actions may be performed in response to the confirmation, such as, without restriction, adding entries to calendars of the users regarding the time and location of the meeting, sending email reminders to the users about the meeting with particulars of the address of the particular physical meeting location, sending driving directions to the users from each user's location to the selected particular physical meeting location, and the like.

In this manner, a digital platform used by users for communicating with each other is enhanced by now enabling the platform to automatically suggest a list of physical locations to meet for users. This may save time for the users, which in turn may expedite consummation of transactions between users. Furthermore, the list of suggested physical locations is customized based on information associated with a user such as the location of the user (or users) and determined based upon user preferences that are configurable by the user.

As previously described, in certain embodiments, the list of suggested physical locations may be determined from a pre-configured list of physical locations. This pre-configured list of physical locations may be provided by a provider of the online or digital platform or a third party associated with the provider of the online or digital platform. The pre-configured list of physical locations may be a curated list provided by its provider based upon various factors, such as safety of the physical locations (e.g., a public place such as a restaurant visited by multiple people), ease of access (e.g., proximity to highways, etc.), convenience to users of the digital platform, and other factors.

In another example, in an online or digital marketplace platform environment, a computing system (e.g., a server) of the provider of the marketplace platform may receive an indication that a user wishes to sell an item or a service. As part of registering the item or service to be sold via the digital marketplace platform, the system may generate a list of suggested physical locations based on information associated with the user and a pre-configured list of physical locations. The list of suggested physical locations may be displayed on a device used by the user, and the user may select one or more particular locations for delivering the item or service. The selected one or more particular locations may then be displayed, together with information associated with the item or service (e.g., price of the item or service, information describing the item or service, etc.), to other users of the marketplace platform.

In the following description, for the purposes of explanation, specific details are set forth in order to provide a thorough understanding of examples of the disclosure. However, it will be apparent that various examples may be practiced without these specific details. For example, devices, systems, networks, processes, and other components may be shown as components in block diagram form in order to not obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

People engaged in a conversation using an online or digital platform, for example, a messaging platform, such as a social networking system or a live chatting platform, may show interest to meet at a physical location at a certain time. For example, after exchanging one or more messages, people may desire to meet for social activities (e.g., social gathering, lunch meeting, dating, and the like), commercial purposes (e.g., buying or selling products or services), or other reasons. Generally, two users engaged in a conversation via a messaging platform may propose a physical location (e.g., a store, a landmark, a library, a school, a restaurant, and the like) to meet based on their personal knowledge or by performing an online search. This process may be time consuming and, in many cases, may lead to a physical location that does not have the desired safety, convenience, comfort for the meeting. For example, for two people meeting physically for the first time, a physical location determined by, for example, an online search may not be safe for one or both of them.

Techniques disclosed herein can be used to detect, during a conversation between two or more users of a messaging platform, the intent of the two or more users to meet at a physical location. Upon detecting the intent, automatically suggest a list of meeting locations that may be safe, convenient, and comfortable for the users. In some embodiments, based upon the contents of the conversation, a determination may be made that the users intend to meet. Upon making such a determination, a user-selectable option (e.g., a meeting location selector) may be presented to the users for the users to decide whether a list of suggested physical locations for the meeting is desired. When a user selects the user-selectable option, a list of one or more suggested physical locations may be automatically generated and presented to the user. The user can select a particular location from the list, and information associated with the selected particular location may then be presented to other user(s). The other user(s) can then accept or reject the selected location or suggest alternative locations. Techniques disclosed herein can also be used when only one user desires to meet at a physical location, for example, when a seller of a product or service desires to deliver the product or perform the service at a physical location, or when a buyer of a product or service desires to receive the product or service at a physical location.

FIG. 1 is a simplified block diagram of an example system 100 that may enable suggesting meeting locations to users, according to certain embodiments. System 100 depicted in FIG. 1 is merely an example and is not intended to unduly limit the scope of inventive embodiments recited in the claims. One of ordinary skill in the art would recognize many possible variations, alternatives, and modifications. For example, in some implementations, system 100 may have more or fewer subsystems than those shown in FIG. 1, may combine two or more systems, or may have a different configuration or arrangement of subsystems.

System 100 may include one or more network servers 110 that can communicate with one or more user devices 120 and 130. Network server(s) 110 may include servers for an online or digital platform such as a messaging platform, a live chatting platform, a text messaging platform, an audio messaging platform, a video messaging platform, an online trading platform, or the like. In some embodiments, the digital platform may be part of or associated with a social networking system. Even though the following description may generally use the term messaging platform, techniques disclosed here are applicable to other online or digital platform enabling users to communicate with each other.

Network server(s) 110 may facilitate digital communications between multiple users such as users of user devices 120 and 130. User device 120 may be used by a first user of the messaging platform, and user device 130 may be used by a second user of the messaging platform. In certain embodiments, user devices 120 and 130 may be communicatively coupled with network server(s) 110 via one or more communication networks (not shown). Examples of communication networks may include, without restriction, the Internet, a wide area network (WAN), a local area network (LAN), an Ethernet network, wireless wide-area networks (WWANs), wireless local area networks (WLANs), wireless personal area networks (WPANs), a public or private network, a wired network, a wireless network, and the like, and combinations thereof. Different communication protocols may be used to facilitate the communications, including both wired and wireless protocols such as IEEE 802.XX suite of protocols, TCP/IP, IPX, SAN, AppleTalk®, Bluetooth®, InfiniBand, RoCE, Fiber Channel, Ethernet, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), and others. A WWAN may be a network using an air interface technology, such as, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A WLAN may include an IEEE 802.11x network (e.g., a Wi-Fi network). A WPAN may be a Bluetooth network, an IEEE 802.15x, or some other types of network.

In some embodiments, network server(s) 110 may include one or more servers of a social networking system that provides a platform that enables users of the social networking system the ability to communicate and interact with other users of the social networking system. Users may join the social networking system by opening an account with the social networking system. Users can then add connections to any number of other users of the social networking system to whom they desire to be connected. The term "friend" is sometimes used to refer to any other users of the social networking system to whom a user has formed a connection, association, or relationship via the social networking system. Connections may be added explicitly by a user or may be automatically created by the social networking system based on common characteristics of the users (e.g., users who are alumni of the same educational institution).

A social networking system can include one or more servers. For example, the social networking system may include an authorization server that enforces one or more privacy settings for users of the social networking system. A privacy setting of a user may determine how particular information associated with the user can be shared. For example, a privacy setting for a user may specify particular information associated with the user (e.g., account or profile information or portions thereof, such as photos, phone numbers, connections, and the like) and may specify one or more entities (e.g., users, applications, external systems) with whom the information can be shared. Privacy settings may be specified at different levels of granularity. For example, the privacy setting may identify specific information to be shared with other users, such as a work phone number or a specific set of related information (e.g., personal information including profile photo, home phone number, and status). Alternatively, the privacy setting may apply to all the information associated with the user. The specification of the set of entities that can access particular information can also be specified at various levels of granularity. For example, a user may specify that the user's personal information may be shared with immediate friends whereas the user's work information may be shared with friends and also with friends of friends. The authorization server may implement logic to determine if certain information associated with a user can be accessed by a user's friends, external systems, and/or other applications and entities.

In some implementations, the messaging platform, such as a social networking system, may store various information for its users in a persistent memory 140. Persistent memory 140 may include one or more databases or data stores, and may include any combination of, for example, storage class memory (SCM), solid-state drives (SSDs), optical drives, magnetic drives, and the like. In some implementations, the messaging platform may store information about its users in a user information database (or data store) 144. The user information may include biographic, demographic, and other types of descriptive information, such as work experience, educational history, hobbies or preferences, user location information, and the like, that has been declared by users or inferred by the social networking system. For example, in some cases, the user location information of a user may include the home, work, or mailing address of the user. In some implementations, the user location information may include the current location of the user, which may be inferred from, for example, the location of a user device (e.g., a smart phone) used by the user. The location of the user device may be determined using, for example, a GPS subsystem of the user device or the relative locations (e.g., distances or angles) of the user device with respect to several (e.g., 3 or more) access points with known locations in a wireless communication network (e.g., by trilateration or triangulation). In some implementations, user information database 144 may store user preference information, which may include, for example, favorite coffee shops, bars, gyms, restaurants, stores, and the like. In some implementations, such preference information may be determined by network servers(s) 110 based on past activities of the user. In some implementations, the user preference information may be declared by the user. For example, the user may declare the preferred locations to meet for a social meeting. In some implementations, the user information may be stored as user profiles in a user profile store where each user may be uniquely identified.

In some embodiments, at least some of the user information may be stored as a social graph (e.g., a data structure including edges and nodes) in a social graph database (or data store) 142. A social graph may represent the social network of users of the messaging platform (e.g., a social networking system). The social networking system can facilitate linkages between a variety of entities, including users, groups, and the like. These entities may be represented by nodes of a social graph interconnected by one or more edges. A node in the social graph may represent an entity that can act on another node representing another entity and/or that can be acted on by the entity corresponding to another node.

A social graph may include various types of nodes corresponding to users, non-person entities, content items, web pages, groups, activities, messages, concepts, and other things that can be represented by objects in a social networking system. In one embodiment, if users of a social networking system are represented as nodes in the social graph, the term "friend" may refer to an edge formed between and directly connecting two user nodes. An edge between two nodes in the social graph may represent a particular kind of connection, or association, between the two nodes, which may result from node relationships or from an action that was performed by an entity represented by one of the nodes on an entity represented by the other node. In some cases, the edges between nodes may be weighted. In certain embodiments, the weight associated with an edge may represent an attribute associated with the edge, such as a strength of the connection or association between nodes. Different types of edges can be provided with different weights. For example, an edge created when one user "likes" another user may be given one weight, while an edge created when a user befriends another user may be given a different weight.

Figure 2:
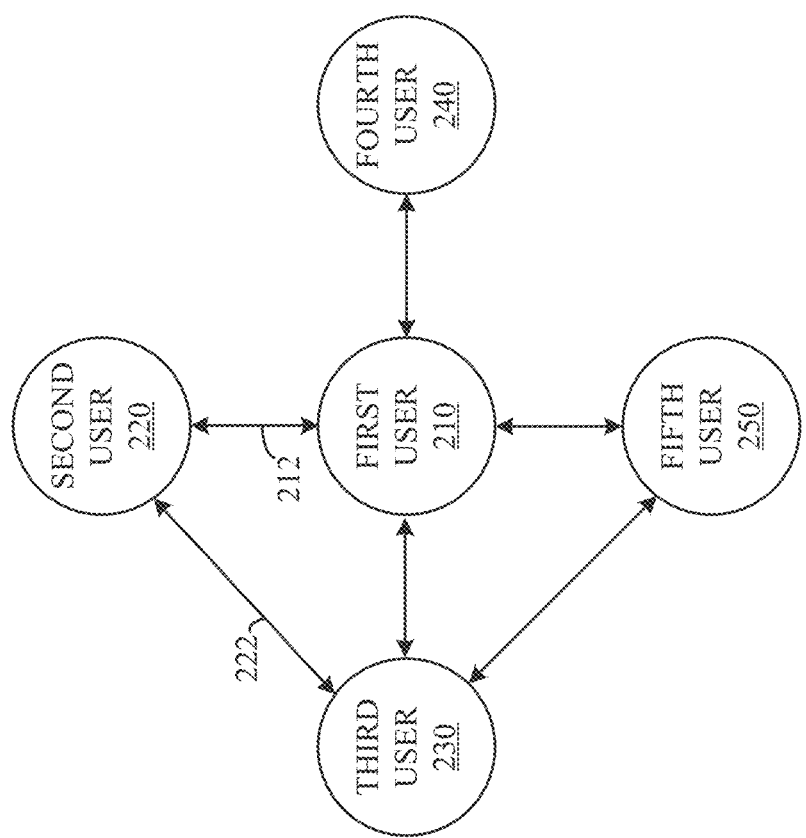
FIG. 2 is a diagram illustrating an example social graph with bidirectional connections between users of a social networking system, according to certain embodiments.

FIG. 2 is a diagram illustrating an example social graph 200 with bidirectional connections between users of a social networking system, according to certain embodiments. Social graph 200 may include multiple users, each user including at least one bidirectional connection. In one example, a first user 210 may have a bidirectional connection with a second user 220 (i.e., a bidirectional connection 212), a third user 230, a fourth user 240, and a fifth user 250. In another example, second user 220 may have a bidirectional connection with first user 210 (i.e., bidirectional connection 212) and third user 230 (i.e., a bidirectional connection 222). In another example, third user 230 may have a bidirectional connection with first user 210, second user 220 (i.e., bidirectional connection 222), and fifth user 250. In yet another example, fourth user 240 may have a bidirectional connection with first user 210. In yet another example, fifth user 250 may have a bidirectional connection with first user 210 and third user 230.

In some examples, a bidirectional connection may be established by either user associated with the bidirectional connection. For example, either first user 210 or second user 220 may request to add bidirectional connection 212. In response to the request, bidirectional connection 212 may be added to social graph 200. While bidirectional connection 212 may be added without a user accepting the request, some examples may require that both users agree to bidirectional connection 212. For example, first user 210 may request bidirectional connection 212 and second user 220 may accept the request.

In some implementations, some of the connections between users in a social graph may be unidirectional. In some examples, a unidirectional connection may be established when a user requests to receive content from another user based upon the unidirectional connection.

In some implementations, the messaging platform, such as a social networking system, may also store user-generated contents in persistent memory 140. The user-generated contents may include anything a user can add, upload, send, or "post" to the social networking system to be shared with other users. For example, the user-generated contents may include textual data, location information, images (e.g., photos), videos, links, music, or other similar data and/or media. Content "items" may be represented as objects within the social networking system.

In certain embodiments, the messaging platform may also store information associated with a set of physical locations in a location information database (or data store) 146 in persistent memory 140. The information associated with the set of physical locations may include, for example, maps or directions to the physical locations, safety information associated with the physical locations, traffic information associated with the physical locations, user feedback regarding the physical locations, statistics of the physical locations (e.g., the accumulative number of times a location is mentioned or chosen as a meeting location by users of the messaging platform), operating time of the locations, rankings of the locations based on different criteria, and the like. In some implementations, location information database 146 may include information for locations that meet one or more minimum requirements or criteria, such as safety, user rating, ease of access (e.g., by public transportation), or comfort criteria. The location information may be collected and accumulated by network server(s) 110 based on activities of the users on the messaging platform and/or information from other private or public resources, such as other statistics tools or applications (e.g., a user rating application), or other databases (e.g., safety report from a local police department). In some implementations, location information database 146 may store a pre-configured list of physical locations that is curated by the provider of the messaging platform based on accumulated or crowdsourced location information and the one or more minimum requirements or criteria.

In some implementations, network server(s) 110 may implement a location suggestion subsystem 112. Location suggestion subsystem 112 may be configured to monitor messages entered, transmitted, and/or exchanged through the messaging platform, and detect the intent of a user of the messaging platform to meet or to deliver an item at a physical location. For example, location suggestion subsystem 112 may implement one or more machine learning techniques (e.g., certain classification techniques) to detect the intent of the users based on, for example, the content of one or more messages entered or sent by a user and/or the relationship between the user and a user that the message is to be sent to (e.g., based on social graphs of the users stored in social graph database 142). In some implementations, monitoring the messages on the messaging platform and detecting the intent of one or more users to meet at a physical location may be performed by a subsystem different from location suggestion subsystem in network server(s) 110. For example, a classification or quarantine subsystem or a content filtering subsystem used to filter objectionable materials in a social networking system may be modified to include the additional function of detecting the intent of one or more users to meet at a physical location. Upon detection of the intent of at least one user to meet at a physical location by the classification or quarantine subsystem or content filtering subsystem, an indication may be sent to location suggestion subsystem 112.

When an intent of at least one user to meet at a physical location is detected, location suggestion subsystem 112 may determine a list of one or more physical location as the potential physical locations for the users to meet. The list of one or more physical location may be determined based on, for example, the content of one or more messages entered or sent by a user, the user information (e.g., user information stored in user information database 144 described above), the location information (e.g., a pre-configured list of physical locations) stored in location information database 146, and/or the relationship between the user and a user that the message is to be sent to (e.g., based on social graphs of the users stored in social graph database 142). In one example, location suggestion subsystem 112 may determine the list of physical locations by matching user preferences (e.g., stored in user information database 144) with information (e.g., stored in location information database 146) associated with locations near the current location of the user or the address of the user stored in user information database 144. Location suggestion subsystem 112 may send the determined list of physical locations as a list of suggested physical locations to a user device used by the user and/or user devices used by other users engaged in a conversation. The user may then select one or more locations from the list of suggested physical locations as the selected physical location for a meeting.

In some implementations, instead of generating and sending the list of suggested physical locations to the user upon detecting an intent of the user to meet at a physical location, location suggestion subsystem 112 may first send a meeting location selector to the user device(s). For example, location suggestion subsystem 112 may cause a selectable button or symbol to be displayed on the user device(s). If the button or symbol is selected by a user of the user device, location suggestion subsystem 112 may generate and send the list of suggested physical locations to the user device for displaying to the user. Thus, location suggestion subsystem 112 may only determine the list of suggested physical locations for the user when the user confirms the intent to meet at a physical location. In this way, location suggestion subsystem 112 may not need to use the resources of network server(s) 110 to determine the list of suggested physical locations for the user if the user has not decided to meet at a physical location yet.

In some implementations, other information associated with the list of suggested physical locations may be displayed to the user to assist the user to make the selection. For example, information such as addresses of the suggested physical locations, distances to the user's location, maps of the suggested physical locations, ratings of the suggested physical locations, commute times to the suggested physical locations, and the like, may be displayed to the user.

In some implementations, the user may select a location from the list of physical location and send information indicating the selection by the user to location suggestion subsystem 112. Location suggestion subsystem 112 may cause information associated with the selected location (e.g., a map including the selected location) to be displayed to a target user, such as another user in a conversation or a potential buyer of an item or a service.

In some implementations, network server(s) 110 may also include a map service interface 114 that may provide an interface for using a map service. In some implementations, map service interface 114 may be used by location suggestion subsystem 112 to acquire maps for one or more locations in the list of suggested physical locations. The acquired maps may be displayed to the user together with the list of suggested physical locations. In some implementations, map service interface 114 may also facilitate the users to search for a specific location or a category of locations on a map based on user specified searching criteria.

In some implementations, network server(s) 110 may also include a scheduler 116. Scheduler 116 may be used to schedule the meeting for the users. For example, scheduler 116 may have access to the calendars for the users, and may be used to determine an appropriate time for the meeting. In some implementations, the scheduled meeting may be added to the calendars for the users, which may send a reminder to the users at a time (e.g., 30 minutes) before the meeting.

User devices 120 and 130 may sometimes be referred to as a client device, or simply a client. User device 120 or 130 may be a computing device, such as, for example, a mobile phone, a smart phone, a personal digital assistant (PDA), a tablet computer, an electronic book (e-book) reader, a gaming console, a laptop computer, a netbook computer, a desktop computer, a thin-client device, a workstation, and the like. User device 120 or 130 may also include a location detection subsystem, such as a GPS subsystem or another wired or wireless location determination subsystem.

One or more applications ("apps"), such as a user app 122, may be hosted and executed by user device 120 or 130. The apps may be web browser-based applications or installable mobile device applications. The applications may allow user(s) to interact with service provider computer(s) to, for example, access web content (e.g., web pages, music, images, videos, files, databases, and the like). In some implementations, user app 122 may be a messaging app. In some implementations, user app 122 may be associated with a trading platform (e.g., a peer-to-peer trading platform) for people in a local community, a metropolitan, or a large geographical area to buy or sell items or services. For example, user app 122 may communicate with one or more network server(s) 110 that provides the trading platform to search for items for sale, post items for sale, or buy items from other users of the trading platform. For example, user app 122 may display information associated with an item for sale, such as, for example, a description of the item, the price, and, in some cases, a list of suggested physical locations where the item may be picked up or delivered.

In one specific example, a first user of user device 120 may desire to sell an item on the trading platform using user app 122. The first user may provide information associated with the item, such as a description, one or more photos, and the price of the item, to network server 110 using user app 122. When network server 110 (e.g., location suggestion subsystem 112 or another subsystem of network server 110) determines that the first user intends to sell an item, network server 110 may query the first user through user app 122 on user device 120 regarding how the first user desires to deliver the item (e.g., shipping by a third party carrier, personally delivering to a physical location, or picking up by a potential buyer at a physical location). If the first user chooses to personally deliver the item to a physical location to complete the transaction, network server 110 may determine a list of suggested physical locations to display to the first user through user app 122 on user device 120. The first user may select one or more locations from the list of suggested physical locations using user app 122 as the preferred meeting location(s). Upon receiving information regarding the selection of the one or more locations by the first user, location suggestion subsystem 112 may, for example, store information associated with the one or more locations (e.g., address, map, direction, and the like) and information associated with the item for sale in a for-sale item database. The information associated with the one or more locations and the information associated with the item for sale may be retrievable by or may be automatically displayed to the first user through user app 122 on user device 120 or a second user of user device 130 (who might be interested in the item) through user app 122 on user device 130. In some cases, when the second user decides to buy the item and accepts a first physical location in the one or more physical locations selected by the first user, user device 130 may send a message to the first user using user app 122 through the trading platform or a different messaging platform (e.g., a messenger). The message may indicate that the second user is interested in the item and would like to meet at the first physical location.

In another example, if the second user is interested in an item for sale by the first user, the second user may start a live conversation with the first user using user app 122 or a different messaging platform (e.g., a messenger) to ask questions or to indicate the intent to buy the item. Network server 110 (more specifically, location suggestion subsystem 112 or another subsystem) may monitor the conversation between the first user and the second user. Upon detection of the intent of the first user and/or the second user to meet at a physical location to deliver the item, location suggestion subsystem 112 may provide a list of suggested physical locations for the meeting to the first user and/or a list of suggested physical locations for the meeting to the second user. In some implementations, the list of suggested physical locations for the first user may be determined using user information associated with the first user, and the list of suggested physical locations for the second user may be determined using user information associated with the second user. Thus, the list of suggested physical locations for the first user may be different from the list of suggested physical locations for the second user. In some implementations, the list of suggested physical locations for the first user and the list of suggested physical locations for the second user may be determined using both the user information associated with the first user and the user information associated with the second user. Thus, the list of suggested physical locations for the first user may be the same as or similar to the list of suggested physical locations for the second user. Either the first user or the second user may select a physical location from the list of suggested physical locations displayed on their respective user devices, and the information associated with the selected physical location may then be sent to other user engaged in the conversation by location suggestion subsystem 112 for the other users engaged in the conversation to accept or reject.

Figure 3:
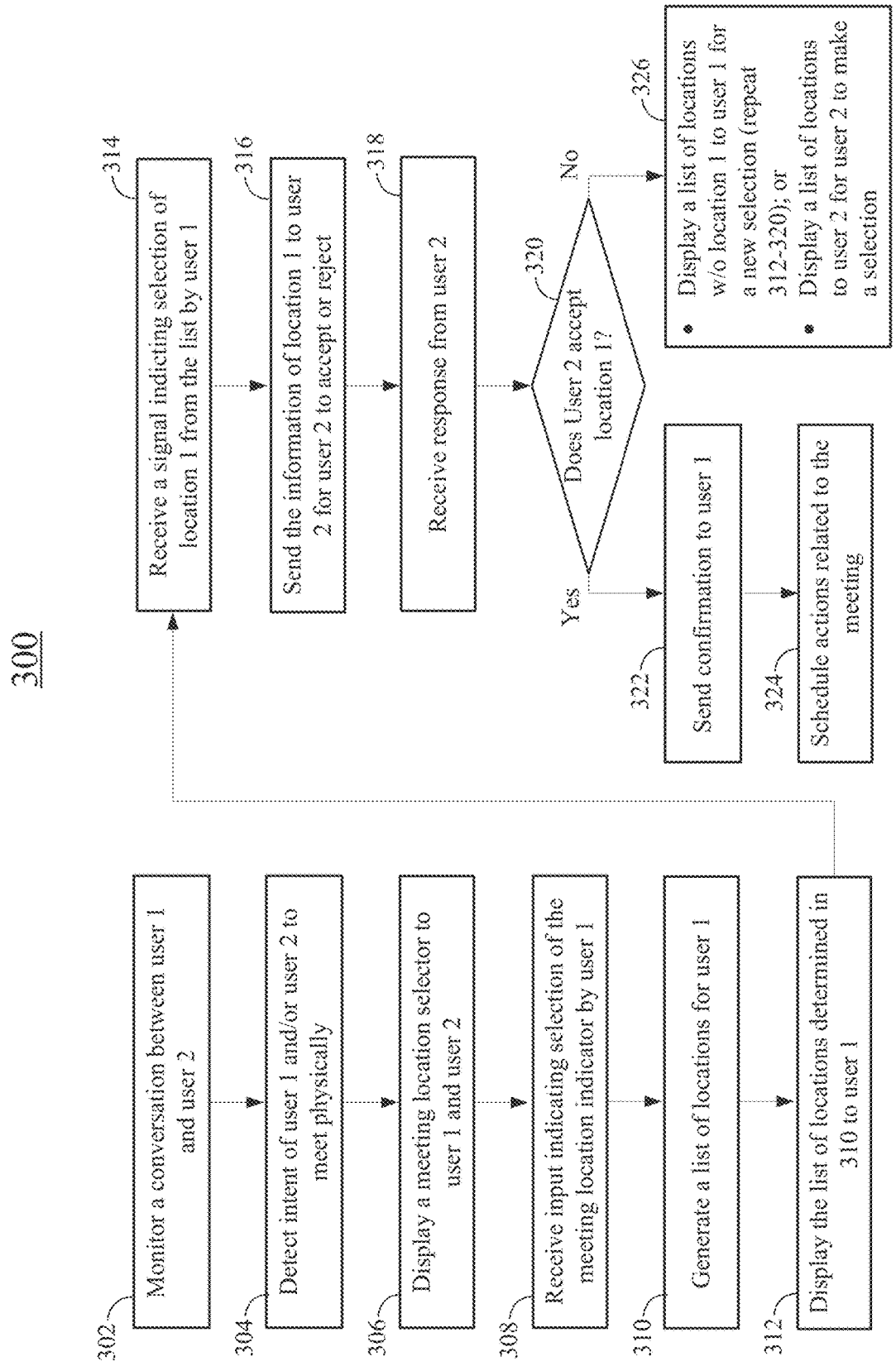
FIG. 3 is a simplified flow chart illustrating an example method for suggesting meeting locations to users, according to certain embodiments.

FIG. 3 is a simplified flow chart 300 illustrating an example method for suggesting meeting locations to users, according to certain embodiments. The processing depicted in FIG. 3 may be implemented in software (e.g., code, instructions, program) executed by one or more processing units (e.g., processors, cores) of a computing system, hardware, or combinations thereof. The software may be stored on a non-transitory storage medium (e.g., on a memory device). The method presented in FIG. 3 and described below is intended to be illustrative and non-limiting. The particular series of processing steps depicted in FIG. 3 is not intended to be limiting. Although FIG. 3 depicts the various processing steps occurring in a particular sequence or order, this is not intended to be limiting. In certain alternative embodiments, the steps may be performed in some different order or some steps may be performed in parallel. In certain embodiments, the processing depicted in FIG. 3 may be performed by location suggestion subsystem 112 of FIG. 1, alone or in combination with, for example, map service interface 114, scheduler 116, and user app 122.

At 302 of simplified flow chart 300 depicted in FIG. 3, a location suggestion subsystem (e.g., location suggestion subsystem 112) of a messaging platform (e.g., a social networking system or a trading platform) or another subsystem (e.g., a classification and quarantine subsystem or a content filtering subsystem) of the messaging platform may monitor a conversation between a first user and a second user of the messaging platform. For example, the conversation may be between a seller and a buyer on a peer-to-peer trading platform regarding an item for sale. In another example, the conversation may be a chat between two users of a social networking system that may or may not know each other before. The location suggestion subsystem or another subsystem of the messaging platform may, for example, monitor the text messages or audio messages exchanged during the conversation. In some implementations, the audio messages may be converted into text messages for the monitoring.

At 304, the location suggestion subsystem or another subsystem of the messaging platform may detect the intent of the first user and/or the second user to meet at a physical location base on, for example, the content of the messages exchanged during the conversation. In some implementations, the location suggestion subsystem or another subsystem of the messaging platform may search the text messages or audio messages (e.g., converted to text messages) exchanged during the conversation for certain words or phrases that may indicate an intent to meet at a physical location. In some implementations, the location suggestion subsystem or another subsystem of the messaging platform may detect the intent of at least one user engaged in a conversation via the messaging platform to meet at a physical location based on additional information, such as the relationships between the first user and the second user and the subject of the conversation (e.g., a social gathering, a lunch, a business meeting, and the like). In some implementations, one or more machine learning techniques (e.g., a classification technique) may be used to detect the intent of at least one user in the conversation to meet at a physical location, based on the combination of various types of information, such as the content of the conversation, keywords in the messages, the relationships between the first user and the second user, and the like.

Optionally, at 306, upon detecting that at least one user in the conversation intends to meet at a physical location, the location suggestion subsystem may display a meeting location selector to the first user and/or the second user. The meeting location selector may be, for example, a button, a check box, a symbol, or another displayed item that can be selected or otherwise operated on to provide an input indicating the desire of one user to select a physical location for a meeting. In some implementations, the meeting location selector may be relative small in order not to occupy a large area of the display of the user device that may otherwise be used for displaying, for example, the messages and/or the key pads for entering the text messages, such that the user experience may not be significantly affected if the users are not ready to select a physical location for the meeting yet. In some embodiments, the meeting location selector may be shown to both the first and the second users. In some embodiments, the meeting location selector may only be shown to the user that shows an intent to meet.

Optionally, at 308, the location suggestion subsystem may receive an input from a first user device used by the first user. The input may indicate the selection of the meeting location selector by the first user. The input may be sent by the first user device based on the input of the first user (e.g., selecting the meeting location selector to indicate the desire to receive a list of suggested physical locations). In embodiments where the meeting location selector is shown to both the first and the second users, one or both of the users may select the meeting location selector.

At 310, upon receiving the input indicating the selection of the meeting location selector by the first user, the location suggestion subsystem may generate a list of physical locations for the first user (which may be referred to as the list of suggested physical locations). As described above, the location suggestion subsystem may generate the list of suggested physical locations for the first user based on, for example, information associated with the first user and a pre-configured list of physical locations. The information associated with the first user and the pre-configured list of physical locations may be retrieved from one or more data stores or one or more databases stored in a persistent memory, such as persistent memory 140. The location suggestion subsystem may access information associated with the first user from one or more data stores. The location suggestion subsystem may also access a pre-configured list of physical locations from the one or more data stores. The location suggestion subsystem may then generate the list of physical locations by selecting one or more physical locations from the pre-configured list of physical locations based upon the information associated with the first user.

For example, the information associated with the first user may be retrieved from a user information database (or data store) of the messaging platform, such as user information database 144. The information associated with the first user may include information that has been declared by the user or inferred by the messaging platform, such as social networking connections, user preferences, user location information, and the like. For example, the social networking connections may be determined based on social graphs stored in social graph database 142. The user location information may include the home, work, or mailing address of the user, or the current location of the user. In some implementations, the current location of the user may be determined based on the current location of a user device (e.g., a smart phone) used by the user. The location of the user device may in turn be determined using, for example, the GPS subsystem of the user device or the relative locations of the user device with respect to several (e.g., 3) access points with known locations in a wireless communication network.

In some implementations, the user preferences may include, for example, preferred coffee shops, bars, gyms, restaurants, stores, and the like. In some implementations, such user preferences may be determined by network servers(s) 110 based on past activities of the user. In some implementations, the user preferences may be declared by the user. For example, the user may declare the preferred locations to meet for a social meeting or a business meeting. In some cases, the user may declare a specific location as the preferred location for the meeting. In some cases, the user may declare a category of locations (e.g., a chain store or libraries) as the preferred locations for the meeting. In some cases, the user may declare different preferred meeting locations for different time periods (e.g., weekdays and weekends). In some cases, the user may declare the preferred locations based on certain selection criteria, such as within a certain distance from a location, accessible using public transportation, near highway, high user rating regarding safety or comfort, and the like. In some cases, the user may also declare the preferred time to meet.

The pre-configured list of physical locations may be retrieved from a location information database of the messaging platform, such as location information database 146. As described above, in some implementations, the pre-configured list of physical locations may include physical locations curated by the provider of the messaging platform based on location information associated with certain physical locations and one or more requirements or criteria. The one or more requirements or criteria may include the minimum requirements regarding, for example, safety, user rating, ease of access (e.g., by public transportation), or comfort of a location. For example, in a marketplace situation, where two users may not know each other, one goal may be to suggest places that the users can feel comfortable, safe, and confident to meet. The location information associated with the physical locations may include, for example, maps or directions to the physical locations, safety information associated with the physical locations, traffic information associated with the physical locations, user feedback regarding the physical locations, statistics of the physical locations (e.g., the accumulative number of times a location is mentioned or chosen as a meeting location by the users of the messaging platform), operating time of the physical locations, rankings of the physical locations based on different criteria, and the like. In some embodiments, the location information may be collected and/or accumulated by network server(s) 110 based on activities of the users on the messaging platform and/or information from other private or public resources, such as other statistics tools or applications (e.g., a user rating application) or other databases (e.g., safety reports from local police departments).

The list of suggested physical locations to be presented to the first user may be determined based on various factors and information. In some embodiments, the list of suggested physical locations may be determined at least partially based on a physical location of the user and/or a set of one or more preferences associated with the first user, in combination with the pre-configured list of physical locations. For example, in some embodiments, the list of suggested physical locations may be selected from the pre-configured list of physical locations based on the current physical location of the user. The current physical location of the user may be determined, for example, based upon GPS coordinates of the user's mobile device. For example, if the user is currently detected to be in a geographic location, the list of suggested physical locations presented to the user may only include locations near (e.g., within 10 miles of) the geographic location. In some embodiments, the list of suggested physical locations may be selected from the pre-configured list of physical locations based on a physical location declared by the user, such as the home or business address of the user. For example, the list of suggested physical locations may include physical locations in the pre-configured list of physical memory that are within a certain distance from the user's home address. In some embodiments, the list of suggested physical locations may also be selected from the pre-configured list of physical locations based on the proposed meeting time. For example, if the proposed meeting time is after working hours (e.g., at night) or during a weekend, the list of suggested physical locations may be selected from the pre-configured list of physical locations based on the home address of the user. If the proposed meeting time is during working hours (e.g., 9 am-5 pm on a weekday), the list of suggested physical locations may be selected from the pre-configured list of physical locations based on the business address of the user. In some embodiments, the list of suggested physical locations may be different for different proposed meeting times, even if the same user location information is used. For example, a physical location may meet the one or more requirements or criteria during certain time periods (e.g., during daytime or during weekends), but may not be as favorable during some other time periods (e.g., evenings or rush hours).

In some embodiments, additionally or alternatively, the list of suggested physical locations may be selected from the pre-configured list of physical locations based on one or more preferred locations pre-specified by a user. For example, a user may pre-specify one or more preferred physical locations for a social or business meeting. The user-specified location may be very specific (e.g., Restaurant XYZ on ABC Street in San Francisco) or less specific (e.g., just a name of a chain store, a category of physical locations, or just a city name, etc.). The user-specified location may be used to narrow down the list of suggested physical locations from the pre-configured list of physical locations. For example, in some embodiments, pre-specified categories of preferred locations, such as coffee shops, department stores, fast food chains, movie theaters, or libraries, may be provided by the user and used to narrow down the list of suggested physical locations.

In some embodiments, additionally or alternatively, the list of suggested physical locations may be selected from the pre-configured list of physical locations based on one or more selection criteria pre-specified by a user. The one or more selection criteria pre-specified by the user may include criteria regarding, for example, safety, user rating, ease of access (e.g., by public transportation or near a highway), traffic time, or comfort associated with a location. The user may pre-specify certain selection criteria that may be different from the criteria used by the provider of the messaging platform for determining the pre-configured list of physical locations. In one example, the user may prefer to meet at locations with top ratings (e.g., top 5% or a score of at least 4.5 out of 5) in safety, convenience, and/or comfort. In another example, the user may prefer to meet at locations near a specific highway or street. In yet another example, the user may prefer to meet at locations that can be reached within, for example, 15 minutes from the user's location.

In some embodiments, additionally or alternatively, the list of suggested physical locations may be selected from the pre-configured list of physical locations based on the context of the conversation. For example, the context of the conversation between the users (e.g., between a buyer and a seller of goods, between friends, between family members, between a husband and a wife, between business associates, and the like) may be determined based on the conversation and used to determine the suggested locations. In one example, for a meeting between a buyer and a seller, physical locations with higher safety ratings may be selected. In some embodiments, additionally or alternatively, the list of suggested physical locations may be selected from the pre-configured list of physical locations based on the relationships between the participants of the conversation. For example, if the conversation is taking place between users of a social networking system, information stored by the social networking system for the users (e.g., social graphs) may be used to determine the relationships between the users and to select the locations from the pre-configured list of physical locations. The location suggestion subsystem may use the relationships between the user (e.g., family members, friends, coworkers, business associates, and the like) to select the list of suggested physical locations. Thus, in various implementations, the list of suggested physical locations for a user to meet with different people (e.g., known and unknown people) may be different.

In some embodiments, additionally or alternatively, the list of suggested physical locations may be selected from the pre-configured list of physical locations based on the content of the conversation itself. For example, the list of suggested physical locations may be suggested based on the subject of the conversation, such as for a lunch meeting, for trading products, for picking up people, and the like. In one example, if the subject of the conversation is for a lunch meeting, the list of suggested physical locations may only include dining locations selected from the pre-configured list of physical locations.

In some embodiments, the list of suggested physical locations may be selected from the pre-configured list of physical locations based additionally on information associated with the second user. For example, the list of suggested physical locations may be selected from the pre-configured list of physical locations based on the location information (e.g., current or pre-specified locations) of both the first user and the second user. In one example, the list of suggested physical locations may only include locations that are convenient (e.g., about equidistance or within a certain distance) for both users. In some implementations, other information associated with the second user, such as the one or more preferences of the second user, may be used alternatively or additionally to select the list of suggested physical locations from the pre-configured list of physical locations. In embodiments where both users select the meeting location selector, a list of suggested physical locations may be determined for each of the users.

In some embodiments, the list of suggested physical locations may be ranked or ordered based on, for example, the ratings of the suggested physical locations, the distances of the suggested physical locations from the user's location, the overall matching between the suggested physical locations and the user's preferences, and the like.

At 312, the location suggestion subsystem may send the list of suggested physical locations to the first user device for displaying to the first user. In some implementations, the list of suggested physical locations may be displayed to the first user based on the ranking of the locations. In embodiments where both users select the meeting location selector, a list of suggested physical locations may be shown to each of the users, where the list shown to the first user may be different from the list shown to the second user. In some implementations where the list of suggested physical locations is selected from the pre-configured list of physical locations based on both the information associated with the first user and the information associated with the second user, the same list of suggested physical locations may be displayed to both users. In some implementations, the same list of suggested physical locations may be displayed to both users, but the suggested physical locations may be displayed to different users in different orders. For example, a location more favorable to a first user may be displayed in the top of the list displayed to the first user, while the same location may not be displayed in the top of the list displayed to the second user.

At 314, the first user may select a first location from the list of suggested physical locations as the proposed location. The location suggestion subsystem may receive a signal from the first user device indicating the selection by the first user. In some embodiments where a list of suggested physical locations is shown to each of the users, the location suggestion subsystem may use the first selected location as the proposed location for the meeting. In some implementations, the first user may select more than one location from the list. For example, the first user may select the first location as the first option, a second location as the second option, a third location as the third option, and the like. In some implementations, a user interface may also be provided to the first user for the first user to specify or search for a preferred location that may not be in the list of suggested physical locations.

At 316, the location suggestion subsystem may send information associated with the first location to the second user device used by the second user, after the first user selects the first location as the proposed location for the meeting. The information associated with the first location may include, for example, a map, a direction, or a link to a website for the first location. In some implementations, the location suggestion subsystem may send information associated with additional locations to the second user device. For example, information associated with the second location (as the second option) and the third location (as the third option) may be displayed to the second user. In another example, at least a part of the list of suggested physical locations displayed to the first user may be sent to the second user device with the first location selected by the first user annotated as the preferred location.

At 318, the location suggestion subsystem may receive a response from the second user. The response may indicate whether the second user accepts or rejects the first location. In some implementations, the response may indicate whether the second user accepts an alternative location (e.g., the location for another option).

At 320, the location suggestion subsystem may determine whether the second user accepts the first location. If the second user accepts the first location, the location suggestion subsystem may send a confirmation to the first user at 322. Optionally, at 324, a scheduler may be used to schedule the meeting and/or save the meeting information in, for example, a calendar application that may send a reminder to the users before the meeting.

At 326, if the second user rejects the first location, the location suggestion subsystem may display a list of suggested physical locations (excluding the first location) to the first user for the first user to make a new selection, and then repeat the operations at 312-320. In some implementations, the location suggestion subsystem may alternatively display a list of suggested physical locations to the second user for the second user to make a selection.

Figure 4A:
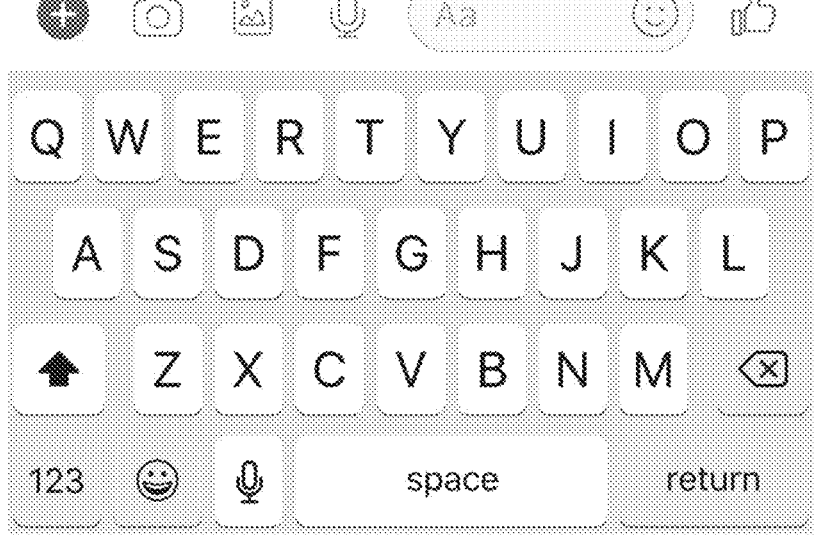
FIGS. 4A-4D illustrate example display contents of a user device used by a user of a messaging platform, according to certain embodiments.

FIGS. 4A-4D illustrate example display contents of a user device used by a user of a messaging platform, according to certain embodiments. FIGS. 4A-4D may illustrate an example use case of flow chart 300. FIG. 4A shows example display contents 410 of the user device used by the seller of an item (e.g., a TV) at a first time instant during a conversation between the seller and a potential buyer. Display contents 410 may include one or more messages 415 exchanged between the seller and the potential buyer. A location suggestion subsystem (e.g., location suggestion subsystem 112) or another subsystem of the messaging platform may monitor the messages exchanged during the conversation.

Figure 4B:
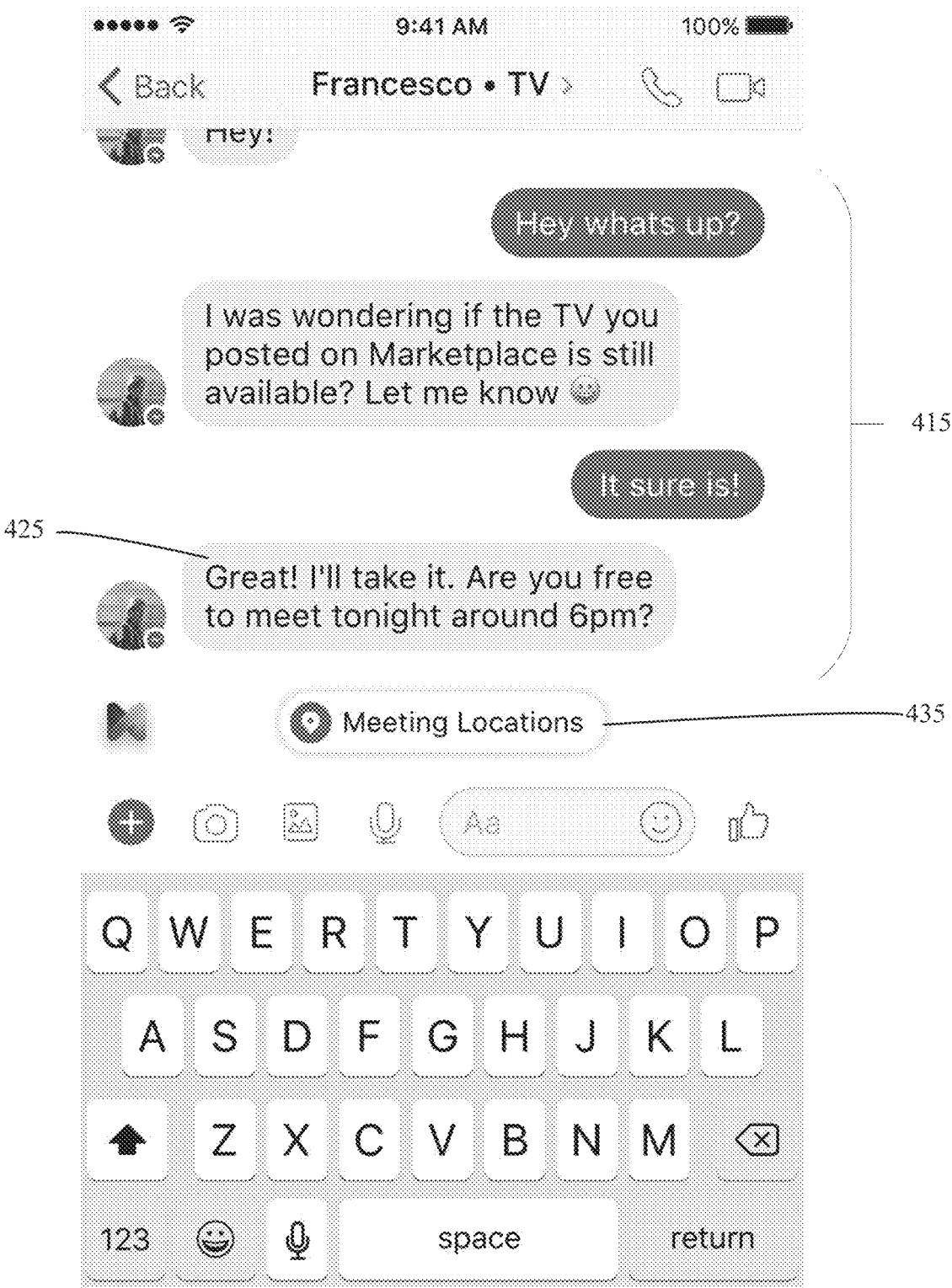

FIG. 4B shows example display contents 420 of the user device used by the seller at a second time instant during the conversation. Display contents 420 may include one or more messages 415 exchanged between the seller and a potential buyer. A message 425 in messages 415 may indicate that the potential buyer would like to meet at a physical location to receive the item. The location suggestion subsystem or another subsystem of the messaging platform that monitors the messages exchanged during the conversation, may detect the intent of the potential buyer to meet, and may cause a meeting location selector 435 to be displayed on the user device used by the seller. In some implementations, a meeting location selector may also be displayed on a user device used by the potential buyer. The meeting location selector may be selectable by the users to indicate the intent to receive a list of suggested physical locations.

Figure 4C:
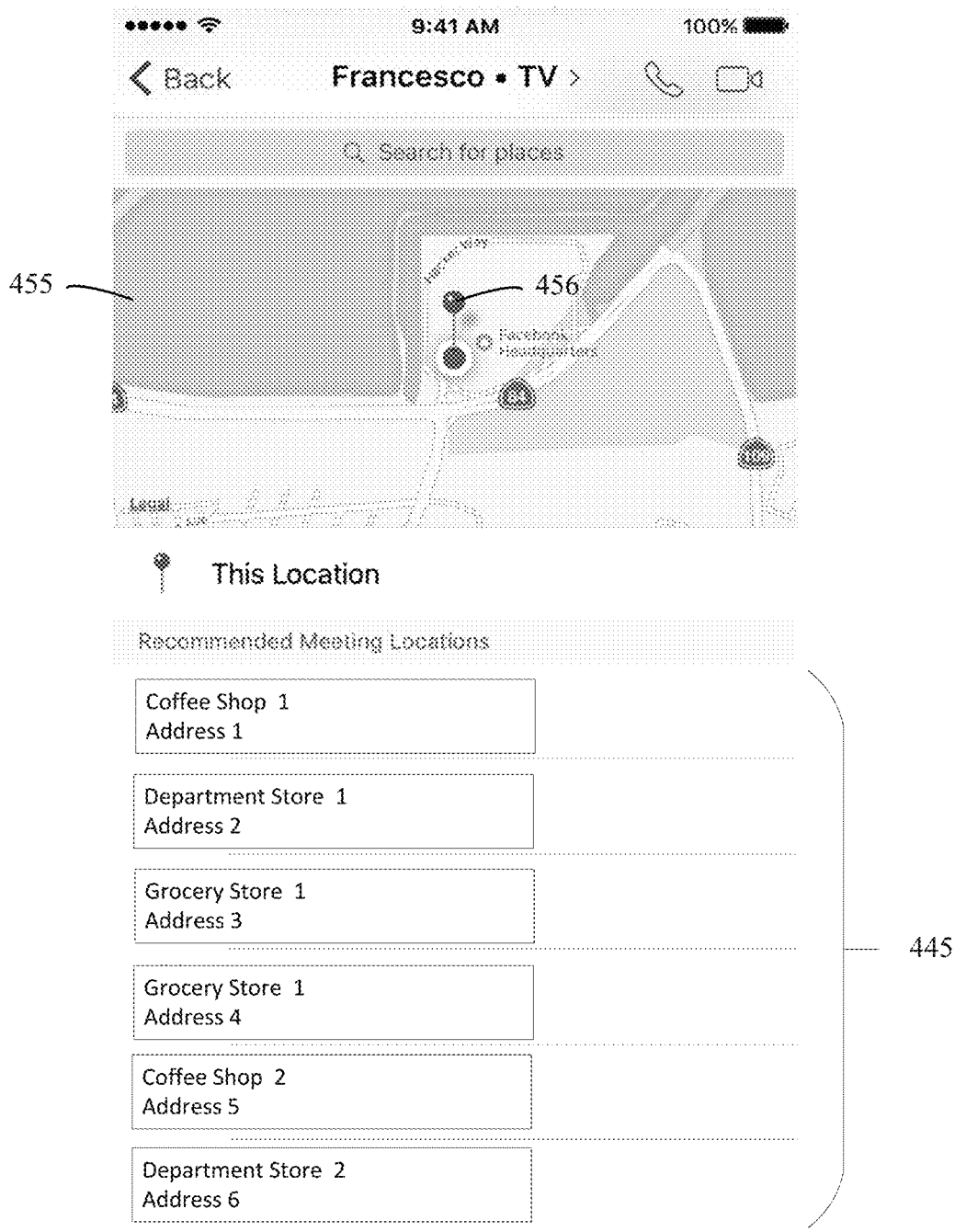

FIG. 4C shows example display contents 430 of the user device used by the seller at a third time instant during the conversation after the seller selects meeting location selector 435. Display contents 430 may include a list of suggested physical locations 445 for the meeting. The list of suggested physical locations 445 may be displayed in an order according to the distance between the current location 456 of the user device used by the seller and each of the suggested physical locations. In the example shown in FIG. 4C, a map 455 including current location 456 of the user device used by the seller may also be displayed to the seller. In some implementations, other suggested physical locations in the list of suggested physical locations 445 may also be shown in map 455.

Figure 4D:
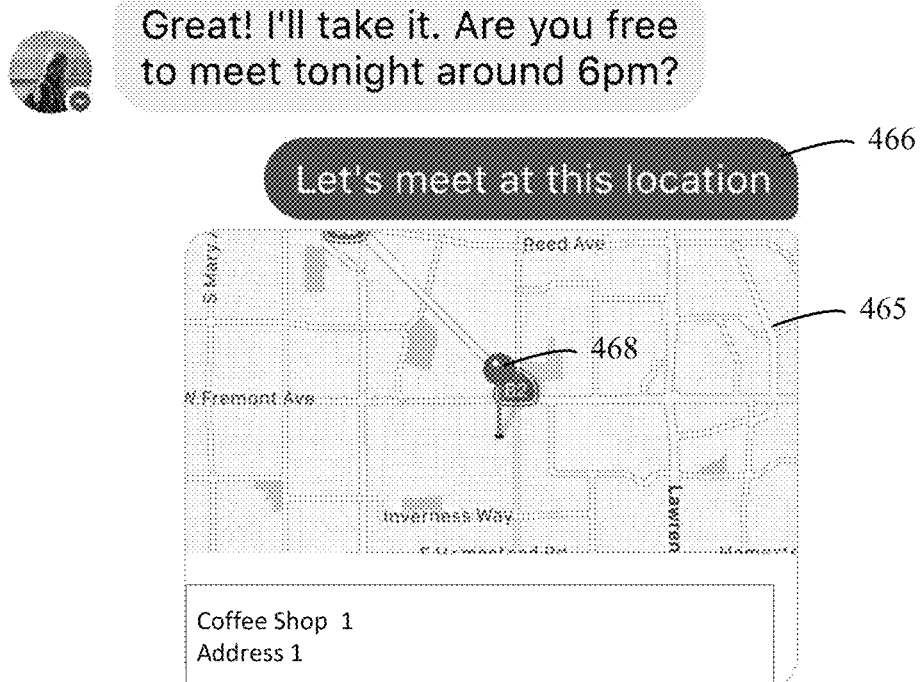

FIG. 4D shows display contents 440 of the user device used by the seller of the item at a fourth time instant during the conversation after the seller selects a location 468 from the list of suggested physical locations. Display contents 440 may include a map 465 including the selected location 468. Map 465 may be automatically displayed to the seller and the potential buyer after the seller selects location 468 by, for example, clicking on the location from the list of suggested physical locations 445. As shown in FIG. 4D, a message 466 may also be automatically shown to the seller and the potential buyer after the seller selects a location from the list of suggested physical locations 445.

In some implements, the techniques disclosed herein may also be used by a user of a messaging platform (e.g., a peer-to-peer trading platform) to select a physical location for a meeting before or without engaging in a conversation with another user. For example, the techniques disclosed herein may be used to provide a list of suggested physical locations to a seller of an item or service for the seller to select one or more preferred locations for delivering the item or performing the service.

Figure 5:
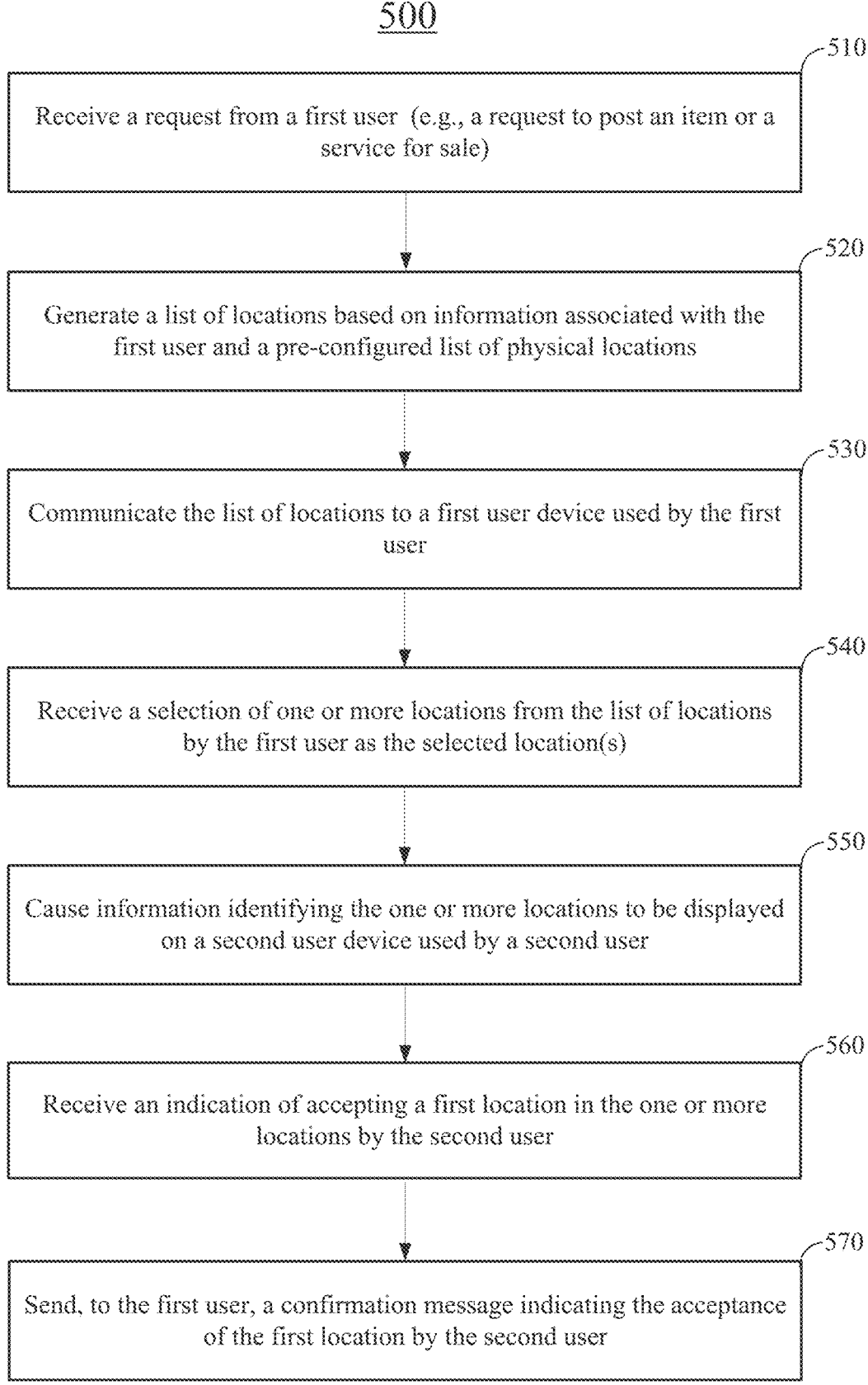
FIG. 5 is a simplified flow chart illustrating an example method for suggesting meeting locations for delivering an item or a service, according to certain embodiments.

FIG. 5 is a simplified flow chart 500 illustrating an example method for suggesting meeting locations for delivering an item or a service, according to certain embodiments. The processing depicted in FIG. 5 may be implemented in software (e.g., code, instructions, program) executed by one or more processing units (e.g., processors, cores) of a computing system, hardware, or combinations thereof. The software may be stored on a non-transitory storage medium (e.g., on a memory device). The method presented in FIG. 5 and described below is intended to be illustrative and non-limiting. The particular series of processing steps depicted in FIG. 5 is not intended to be limiting. Although FIG. 5 depicts the various processing steps occurring in a particular sequence or order, this is not intended to be limiting. In certain alternative embodiments, the steps may be performed in some different order or some steps may be performed in parallel. In certain embodiments, the processing depicted in FIG. 5 may be performed by location suggestion subsystem 112 of FIG. 1, alone or in combination with, for example, map service interface 114, scheduler 116, and user app 122.

At 510, a location suggestion subsystem of a messaging platform (e.g., a peer-to-peer trading platform) may receive request from a first user, for example, to sell an item or a service. The request may be sent from a first user device used by the first user when, for example, the first user tries to add an item for sale to the trading platform. Upon receiving the indication, the messaging platform may create a data object associated with the request. For example, the data object may be associated with the item or service for sale. The data object may include a data structure for storing various information associated with the item or service.

At 520, upon receiving the indication, the location suggestion subsystem may generate a list of suggested physical locations, for example, for delivering the item or performing the service. The location suggestion subsystem may access information associated with the first user from one or more data stores. The location suggestion subsystem may also access a pre-configured list of physical locations from the one or more data stores. The location suggestion subsystem may then generate the list of suggested physical locations by selecting one or more physical locations from the pre-configured list of physical locations based upon the information associated with the first user as described above.

At 530, the location suggestion subsystem may communicate the list of suggested physical locations to a first user device used by the first user such that the first user device can display the list of suggested physical locations to the first user.

At 540, the location suggestion subsystem may receive a signal from the first user device. The signal may indicate a selection of one or more locations from the list of suggested physical location by the first user as the selected (or preferred) location(s), for example, for delivering the item or performing the service. The location suggestion subsystem may associate information indicative of the one or more locations selected by the first user (e.g., an address or a map of each of the one or more locations) with the data object created based on the request, for example, a data object associated with the item or service for sale, and store the association between information indicative of the one or more locations and the data object in a database or data store. The database or data store may be searchable by the seller or a potential buyer to view the information associated with the item or service for sale and the information associated with the first location.

At 550, the location suggestion subsystem may send the information identifying the one or more locations selected by the first user to a second user device used by a second user interested in the item or service for displaying to the second user.

At 560, the second user may accept a first location in the one or more locations selected by the first user as the physical location to meet to, for example, receive the item or service. The location suggestion subsystem may receive an indication of accepting the first location by the second user from the second user device.

At 570, upon receiving the indication of accepting the first location as the physical location to meet by the second user from the second user device, the location suggestion subsystem may send a confirmation message including information associated with the first location to the first user. The message may include, for example, an instant message to the first user, an alert to the first user device, or an email to the first user.

Figure 6A:
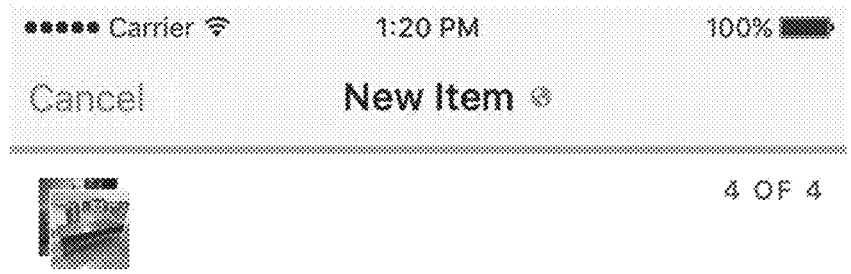

FIGS. 6A-6D illustrate example display contents of a user device used by a seller of an item or service, according to certain embodiments. FIGS. 6A-6D may illustrate an example use case of the techniques described with respect to flow chart 500. FIG. 6A shows example display contents 610 of the user device used by the seller of the item (e.g., a backpack) when the seller adds the item to a trading platform. Display contents 610 may show options for delivering the item. For example, one of the options may be an option (e.g., indicated by a meeting location selector 615) for the seller to meet a potential buyer at a physical location to deliver the item.

Figure 6B:
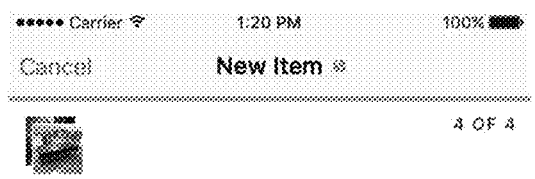

FIG. 6B shows example display contents 620 of the user device used by the seller after the seller selects meeting location selector 615. Display contents 620 may include a list of suggested physical locations 625. The list of suggested physical locations 625 may be determined using the techniques described above. The seller may select a first location 635 from the list, and preview or post the information associated with the item and information associated with first location 635 on the trading platform. In some cases, the seller may select more than one location from the list of suggested physical locations 625.

Figure 6C:
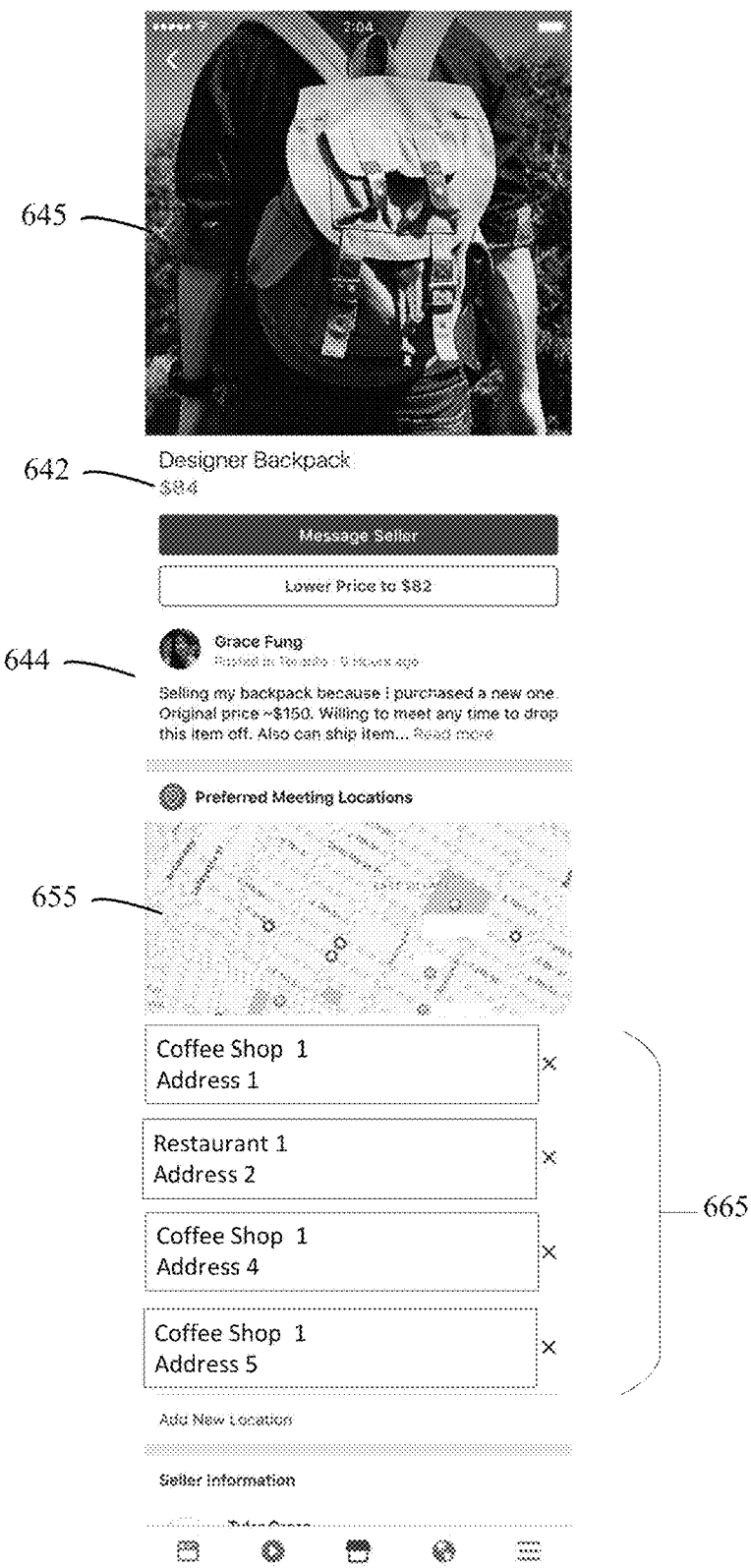

FIG. 6C shows example display contents 630 of the user device used by the seller for previewing by the seller before posting the item for sale on the trading platform. Display contents 630 may include, for example, a photo 645 of the item for sale, a price tag 642 for the item, a brief description 644 of the item, one or more locations 665 selected by the seller, and a map 655 showing the relative locations of the one or more locations selected by the seller. As shown in FIG. 6C, the seller may have the options to delete any of one or more locations 665 selected by the seller and/or add a new location to the one or more locations 665. The seller may post finalized information associated with the item and information associated with the one or more locations 665 selected by the seller on the trading platform.

FIG. 6D shows example display contents 640 of the user device used by the seller after a potential buyer decides to buy the item and accepts one of the one or more locations selected by the seller. Display contents 640 may include, for example, one or more messages 672 from the potential buyer and a map 675 showing the location of the specific physical location accepted by the potential buyer. As described above, in some implementations, the one or more messages 672 and/or map 675 may be automatically displayed to the seller and the potential buyer after the potential buyer accepts a location by, for example, clicking on the location displayed with the item for sale.

Figure 7A:
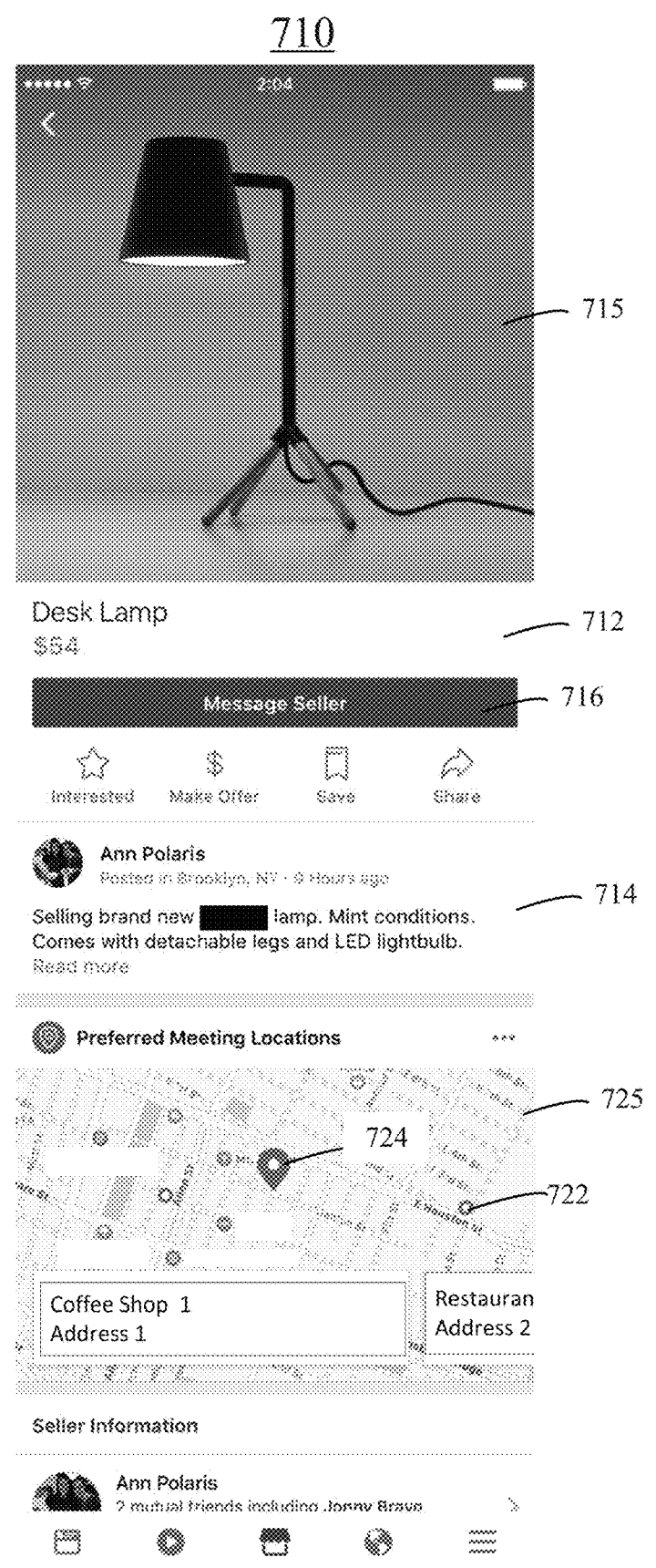
Figure 7B:
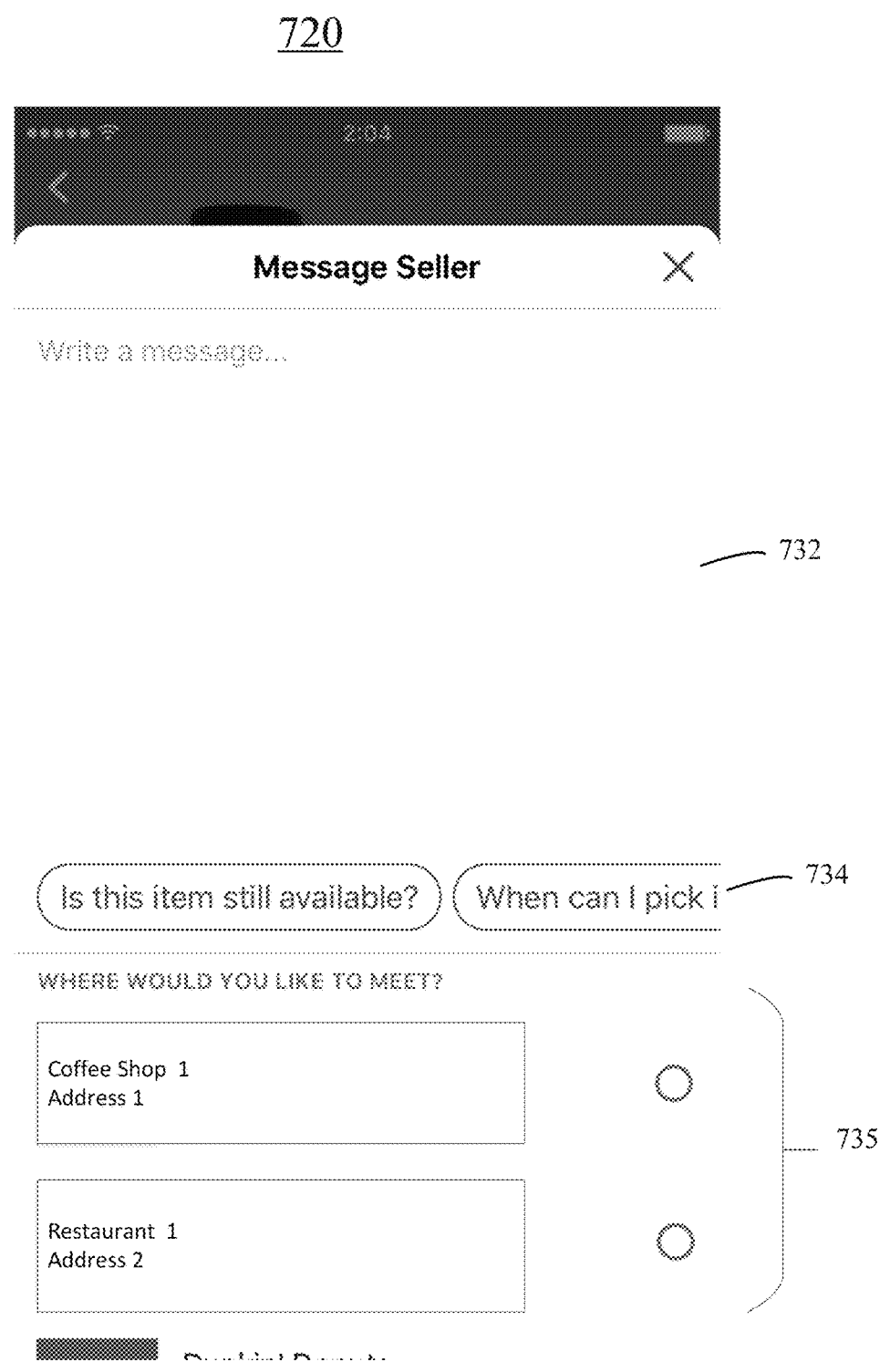
Figure 7C:
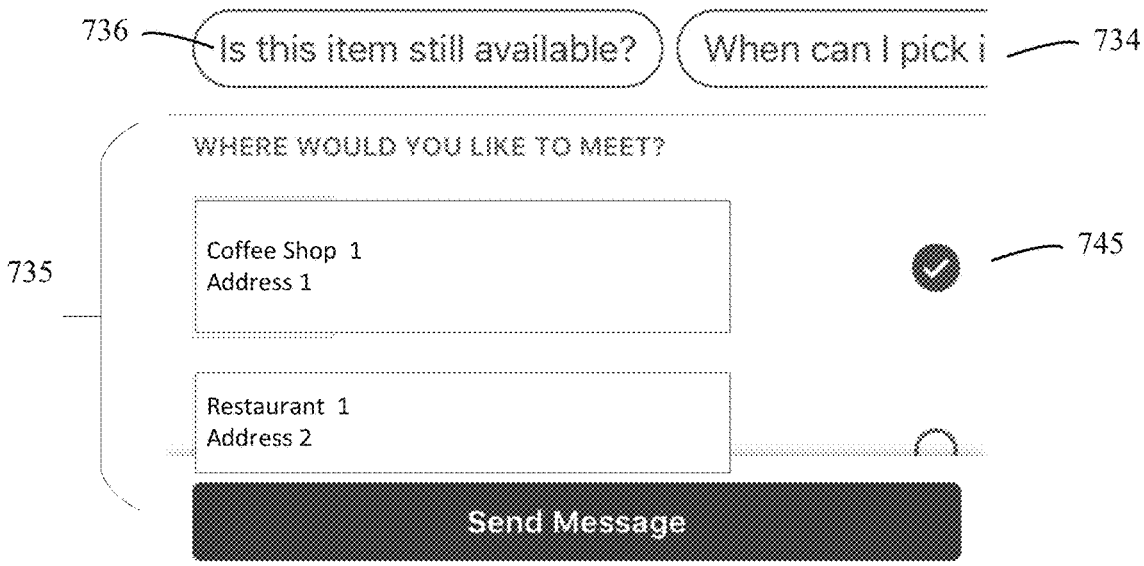

FIGS. 7A-7D illustrate example display contents of a user device used by a potential buyer of an item or service, according to certain embodiments. FIGS. 7A-7D may show another example use case of the techniques described with respect to flow chart 500. FIG. 7A shows example display contents 710 of the user device used by the potential buyer of the item (e.g., a desk lamp) for sale on a trading platform. Display contents 710 may show, for example, a photo 715 of the item for sale, a price tag 712 for the item, a brief description 714 of the item, one or more locations 722 selected by the seller for delivering the item, and a map 725 showing the relative locations of the one or more locations 722 selected by the seller and a current location 724 of the potential buyer. Display contents 710 may also show a selectable bar 716 for starting a conversation with the seller.

FIG. 7B shows example display contents 720 of the user device used by the potential buyer, after the potential buyer selects selectable bar 716. Display contents 720 may show a message window 732, one or more selectable sentences 734, and one or more locations 735 selected by the seller as possible locations for delivering the item. The potential buyer may select one or more sentences from the one or more selectable sentences 734 as the message to the seller or type a message to the seller, and select a location from the one or more locations 735.

FIG. 7C shows example display contents 730 of the user device used by the potential buyer, after the potential buyer selects a first location 745 from the one or more locations 735, and selects a message 736 from the one or more selectable sentences 734.

Figure 7D:
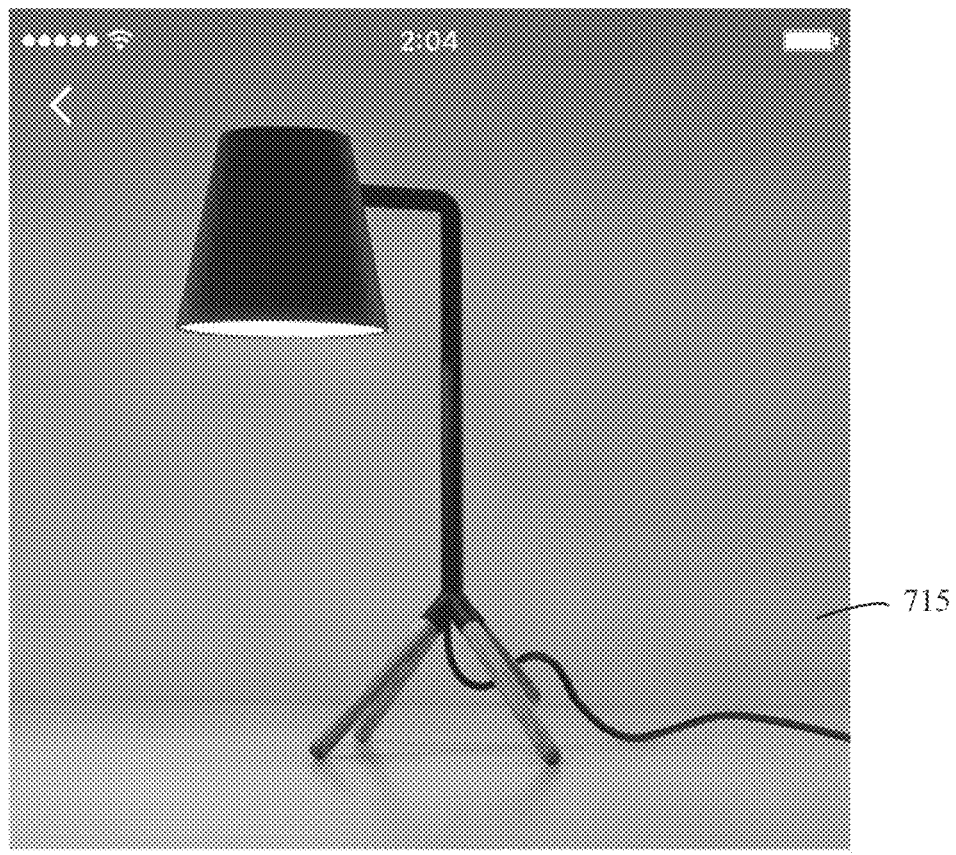

FIG. 7D shows example display contents 740 of the user device used by the potential buyer, after the potential buyer sends message 736 and selects first location 745. An instant message, an alert, or an email may be sent to the seller to notify the seller that a potential buyer is willing to buy the item and has agreed to receive the item at a location in the one or more locations selected by the seller.

Figure 7E:
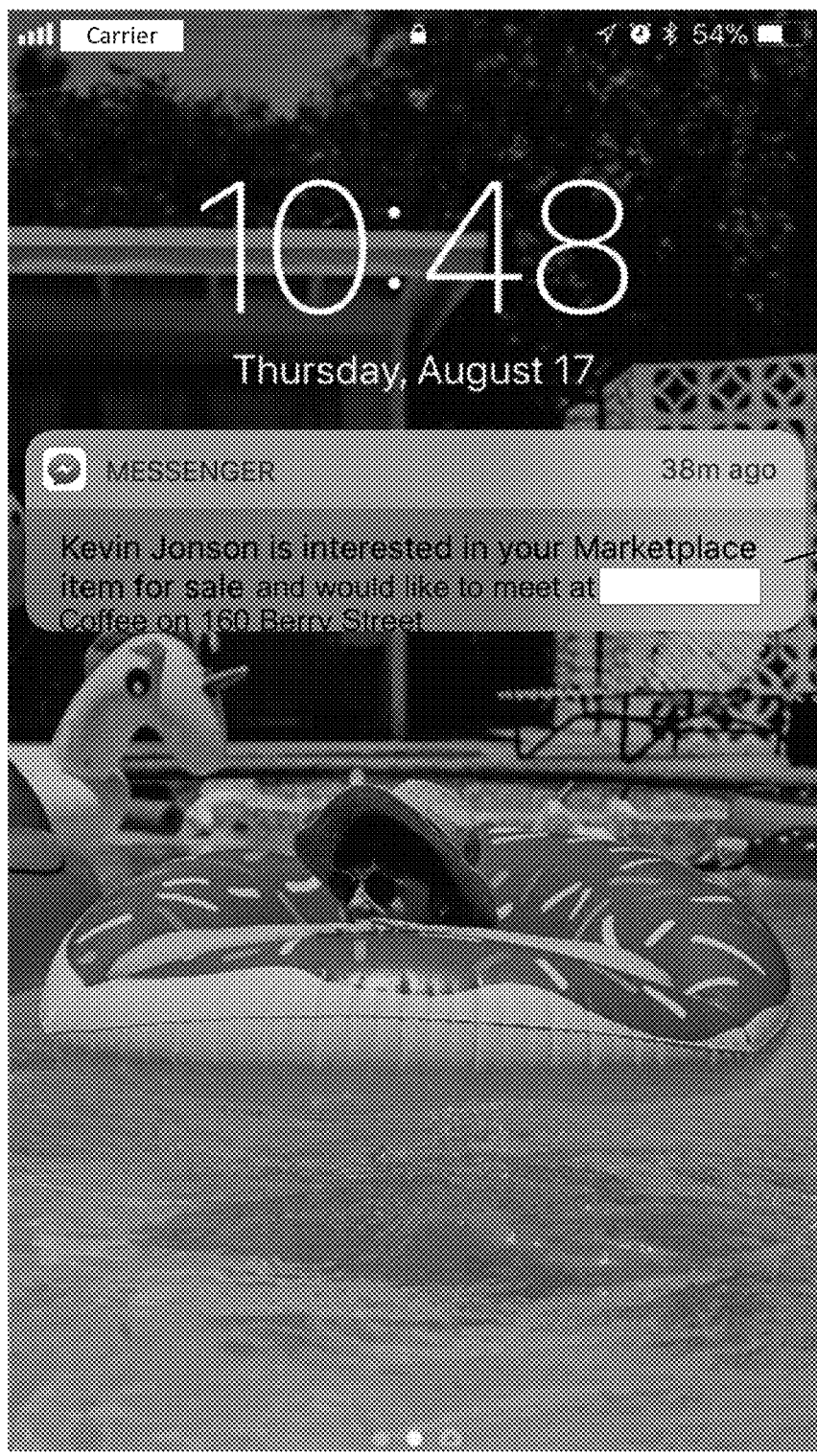
FIG. 7E illustrates example display contents of a user device used by a seller of the item or service after a potential buyer indicates an interest in the item or service, according to certain embodiments.

FIG. 7E illustrates example display contents 750 of a user device used by a seller of the item or service after the buyer indicates an interest in the item or service, according to certain embodiments. Display contents 750 may include a text message 765 indicating that a potential buyer is interested in the item for sale and would like to meet at a location in the one or more locations selected by the seller.

As described above, various general purpose or special purpose devices may be used to implement some of the methods or perform some of the operations disclosed herein. The devices may be portable (e.g., a mobile phone or a laptop computer) or stationary (e.g., a general purpose desktop computer or a server). Some devices may include some or all components for performing some or all operations disclosed herein. Some devices may be combined with one or more other devices to perform some or all operations disclosed herein.

Figure 8:
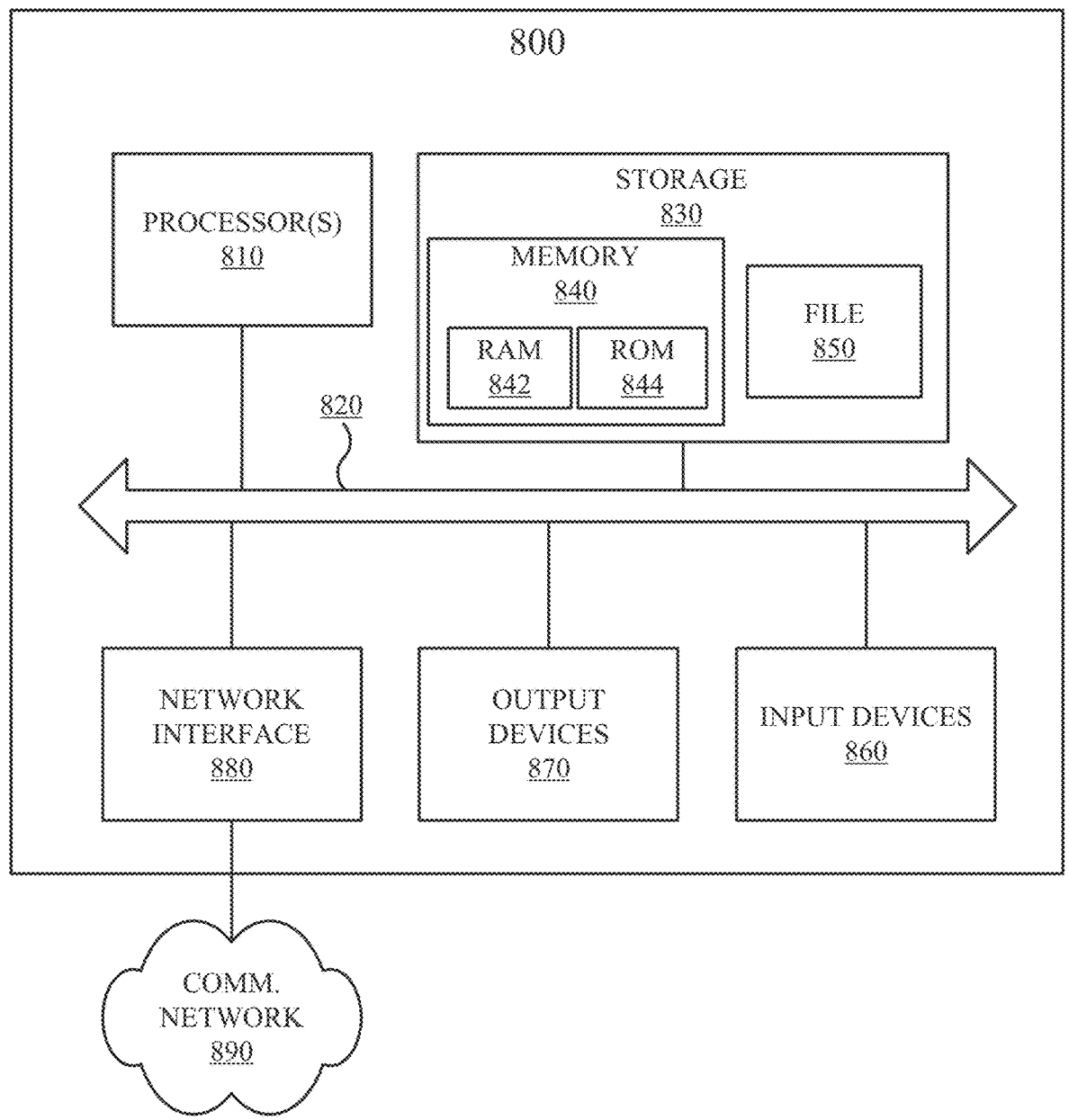
FIG. 8 is a simplified block diagram of an example computing system for implementing some of the examples disclosed herein.

FIG. 8 is a simplified block diagram of an example computing system 800 for implementing some of the examples disclosed herein. Computer system 800 shown in FIG. 8 can be used to implement one or more of user devices 120 and 130 or network server(s) 110. In this example, computing system 800 includes one or more processors 810, a bus 820, a storage system 830, one or more input devices 860, one or more output devices 870, a network interface 880, and the like.

In the present example, input device(s) 860 may include a computer mouse, a trackball, a track pad, a joystick, a wireless remote controller, a drawing tablet, a voice command system, an eye tracking system, and the like. Input device(s) 860 may allow a user to select objects, icons, text, and the like that appear on an output device 870 (e.g., a monitor or display device) via a command such as a click of a button or the like. Output devices 870 may include, without limitation, a display device (e.g., a monitor), a printer, light-emitting diodes (LEDs), speakers, and/or the like.

Examples of network interface 880 may include an Ethernet card, a modem (telephone, satellite, cable, ISDN), (asynchronous) digital subscriber line (DSL) unit, FireWire interface, universal serial bus (USB) interface, and the like. For example, network interface 880 may be coupled to a communication network 890, to a FireWire bus, or the like. In other embodiments, network interface 880 may be physically integrated on the motherboard of computing system 800, may be a software program, such as soft DSL, or the like.

Processor(s) 810 may include, without limitation, one or more general-purpose processors, one or more special-purpose processors (e.g., digital signal processing (DSP) chips, graphics acceleration processors, application-specific integrated circuits (ASICs), and/or the like), and/or other processing structures or means, which can be configured to perform one or more of the methods described herein.

Storage system 830 may include, without limitation, local and/or network accessible storage, and/or can include, without limitation, a disk drive, a drive array, an optical storage device, such as a compact disk read-only memory (CD-ROM) or digital versatile disk (DVD), a solid-state storage device, which may be configured to implement any appropriate data stores, including, without limitation, various file systems 850, database structures, and/or the like. Storage system 830 may include memory 840, such as a random access memory (RAM) 842, and/or a read-only memory (ROM) 844, which can be programmable, flash-updateable, and/or the like. An operating system may be stored in file systems 850, and may be loaded to RAM 842 when computing system 800 is booted. RAM 842 and the disk drive are examples of tangible media configured to store data including executable computer code, human readable code, photos, videos, maps, and other data collected by various entities, heat maps, or the like.

In various examples, computing system 800 may also include software that enables communications over a network using, for example, the HTTP, TCP/IP, RTP/RTSP protocols, and the like. In alternative embodiments, other communications software and protocols may also be used, such as IPX, UDP, or the like.

Figure 9:
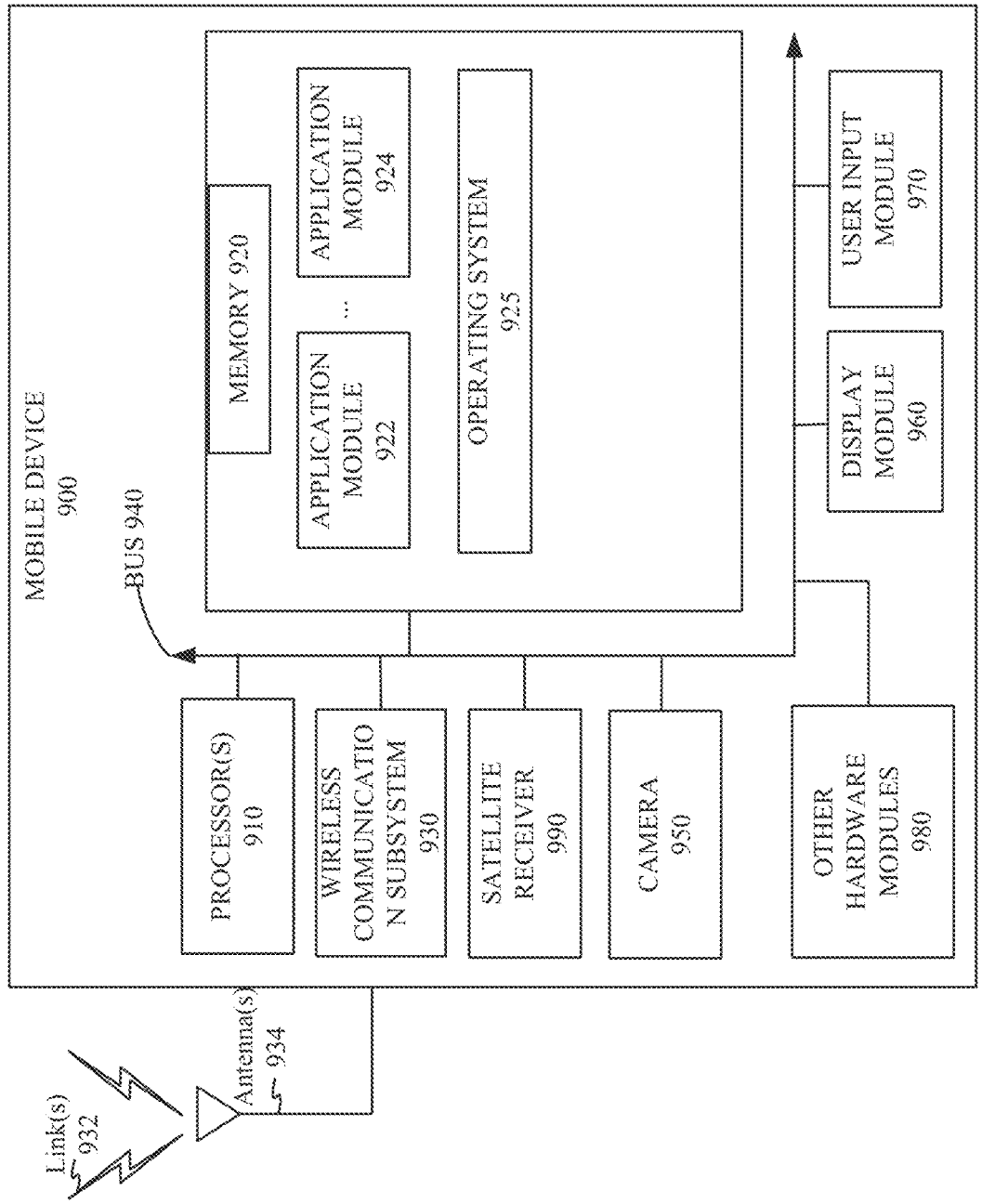
FIG. 9 is a simplified block diagram of an example mobile device for implementing some of the examples disclosed herein.

FIG. 9 is a simplified block diagram of an example mobile device 900 for implementing some of the examples disclosed herein. Mobile device 900 may be used to implement user devices 120 and 130. In this example, mobile device 900 may include one or more processor(s) 910 and a memory 920. Processor(s) 910 may be configured to execute instructions for performing operations at a number of components, and can be, for example, a general-purpose processor or microprocessor suitable for implementation within a portable electronic device. Processor(s) 910 may be communicatively coupled with a plurality of components within mobile device 900. To realize this communicative coupling, processor(s) 910 may communicate with the other illustrated components across a bus 940. Bus 940 may be any subsystem adapted to transfer data within mobile device 900. Bus 940 may include a plurality of computer buses and additional circuitry to transfer data.

Memory 920 may be coupled to processor(s) 910. In some embodiments, memory 920 may offer both short-term and long-term storage and may be divided into several units. Memory 920 may be volatile, such as static random access memory (SRAM) and/or dynamic random access memory (DRAM) and/or non-volatile, such as read-only memory (ROM), flash memory, and the like. Furthermore, memory 920 may include removable storage devices, such as secure digital (SD) cards. Memory 920 may provide storage of computer readable instructions, data structures, program modules, and other data for mobile device 900. In some embodiments, memory 920 may be distributed into different hardware modules. A set of instructions and/or code might be stored on memory 920. The instructions might take the form of executable code that may be executable by mobile device 900, and/or might take the form of source and/or installable code, which, upon compilation and/or installation on mobile device 900 (e.g., using any of a variety of generally available compilers, installation programs, compression/decompression utilities, and the like), may take the form of executable code.

In some embodiments, memory 920 may store a plurality of application modules 922 through 924, which may include any number of applications. Application modules 922-924 may include particular instructions to be executed by processor(s) 910. In some embodiments, certain applications or parts of application modules 922-924 may be executable by other hardware modules 980. In certain embodiments, memory 920 may additionally include secure memory, which may include additional security controls to prevent copying or other unauthorized access to secure information.

In some embodiments, memory 920 may include an operating system 925 loaded therein. Operating system 925 may be operable to initiate the execution of the instructions provided by application modules 922-924 and/or manage other hardware modules 980 as well as interfaces with a wireless communication subsystem 930 which may include one or more wireless transceivers. Operating system 925 may be adapted to perform other operations across the components of mobile device 900 including threading, resource management, data storage control and other similar functionality.

Wireless communication subsystem 930 may include, for example, an infrared communication device, a wireless communication device and/or chipset (such as a Bluetooth® device, an 902.11 device, a Wi-Fi device, a WiMax device, cellular communication facilities, and the like), and/or similar communication interfaces. Mobile device 900 may include one or more antennas 934 for wireless communication as part of wireless communication subsystem 930 or as a separate component coupled to any portion of the system. Depending on desired functionality, wireless communication subsystem 930 may include separate transceivers to communicate with base transceiver stations and other wireless devices and access points, which may include communicating with different data networks and/or network types, such as wireless wide-area networks (WWANs), WLANs, or wireless personal area networks (WPANs). A WWAN may be, for example, a WiMax (IEEE 802.9) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 930 may permit data to be exchanged with a network, other computing systems, and/or any other devices described herein. Wireless communication subsystem 930 may include a means for transmitting or receiving data, such as identifiers of mobile devices, position data, a geographic map, a heat map, photos, or videos, using antenna(s) 934 and wireless link(s) 932. Wireless communication subsystem 930, processor(s) 910, and memory 920 may together comprise at least a part of one or more of a means for performing some functions disclosed herein.

Embodiments of mobile device 900 may also include a satellite receiver 990 capable of receiving signals from one or more SPS satellites using an SPS antenna. Satellite receiver 990 may be used to determine a position of mobile device 900, using conventional techniques, from SPS satellite vehicles (SVs) of an SPS system, such as global navigation satellite system (GNSS) (e.g., GPS), Galileo, Glonass, Compass, Quasi-Zenith Satellite System (QZSS) over Japan, Indian Regional Navigational Satellite System (IRNSS) over India, Beidou over China, and/or the like. Moreover, satellite receiver 990 may use various augmentation systems (e.g., a Satellite Based Augmentation System (SBAS)) that may be associated with or otherwise enabled for use with one or more global and/or regional navigation satellite systems. An SPS system may include any combination of one or more global and/or regional navigation satellite systems and/or augmentation systems, and SPS signals may include SPS, SPS-like, and/or other signals associated with one or more such SPS systems.

Mobile device 900 may include a display module 960 and a user input module 970. Display module 960 may graphically present information, such as various instructions, from mobile device 900 to a user. Such information may be derived from one or more application modules 922-924, one or more other hardware modules 980, a combination thereof, or any other suitable means for resolving graphical content for the user (e.g., by operating system 925). Display module 960 may use liquid crystal display (LCD) technology, light-emitting diode (LED) technology, light emitting polymer display (LPD) technology, or some other display technology. In some embodiments, display module 960 may be a capacitive or resistive touch screen and may be sensitive to haptic and/or tactile contact with a user. In such embodiments, display module 960 may comprise a multi-touch-sensitive display. User input module 970 may include, without limitation, a touchscreen, a touch pad, microphone(s), a keyboard, a mouse, button(s), dial(s), switch(es), and/or the like.

Mobile device 900 may include a camera 950 that may be used to take photos or videos of a user being authenticated. Camera 950 may include, for example, a complementary metal-oxide-semiconductor (CMOS) image sensor with a few millions or tens of millions of pixels. In some implementations, camera 950 may include two or more cameras that may be used to capture 3-D images.

In some embodiments, mobile device 900 may include a plurality of other hardware modules 980. Each of other hardware modules 980 may be a physical module within mobile device 900. While each of other hardware modules 980 may be permanently configured as a structure, some of other hardware modules 980 may be temporarily configured to perform specific functions or temporarily activated. Examples of other hardware modules 980 may include, for example, an accelerometer, a pressure module, a temperature module, an audio output and/or input module (e.g., a microphone), a proximity sensor, an alternate line service (ALS) module, a capacitive touch sensor, a near field communication (NFC) module, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some embodiments, one or more functions of other hardware modules 980 may be implemented in software.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, and the like), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer-program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, and the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
monitoring a set of one or more messages exchanged between a first user and a second user via a messaging platform;
detecting, by a computing system, based upon the monitoring, an intent of the first user to meet at a physical location;
generating, by the computing system, a list of one or more physical locations suitable for in-person meeting based on a relationship between the first user and the second user, wherein:
the generating comprises selecting the one or more physical locations from a pre-configured list of physical locations based upon information associated with the first user, the information associated with the first user comprising a set of one or more preferences of the first user specified with respect to the messaging platform and being extracted from a user profile associated with the messaging platform for the first user;
the relationship between the first user and the second user is determined based upon a social graph stored in a remote social networking system, the social graph identifying the relationship between the first user and the second user; and
the pre-configured list of physical locations is provided by a provider of the messaging platform;
causing, by the computing system, the list of one or more physical locations to be displayed on a first device used by the first user;
receiving, at the computing system from the first device, information indicating selection of a first physical location from the list of one or more physical locations; and
causing, by the computing system, information identifying the first physical location to be displayed on a second device used by the second user for the second user to accept or reject the first physical location.

2. The method of claim 1, wherein generating the list of one or more physical locations comprises:
causing, by the computing system, a meeting location selector to be displayed in an area adjacent to the one or more messages on the first device;
receiving, by the computing system from the first device, information indicating selection of the meeting location selector; and
responsive to receiving the information indicating selection of the meeting location selector:
accessing the information associated with the first user;
accessing the pre-configured list of physical locations; and
selecting the list of one or more physical locations from the pre-configured list of physical locations based upon the information associated with the first user.

3. The method of claim 1, wherein the pre-configured list of physical locations is selected by the provider of the messaging platform from a set of physical locations based upon at least one of:
past selections of physical locations from the set of physical locations by one or more users;
feedback associated with the set of physical locations from one or more users;
ease of access information associated with each of the set of physical locations; or
safety information associated with each of the set of physical locations.

4. The method of claim 3, wherein the safety information associated with each of the set of physical locations comprises at least one of:
safety rating of each of the set of physical locations; or
safety report from police departments.

5. The method of claim 1, wherein the information associated with the first user comprises a physical location of the first user.

6. The method of claim 5, wherein the physical location of the first user comprises:
　a current location of the first user determined from the first device; or
　a physical location associated with the first user and stored in the messaging platform.

7. The method of claim 1, wherein the set of one or more preferences associated with the first user comprises at least one of:
　a physical location associated with the first user;
　a category of physical locations associated with the first user;
　a time to meet associated with the first user; or
　a selection criteria associated with the first user.

8. The method of claim 1, wherein generating the list of one or more physical locations comprises:
　generating the list of one or more physical locations by matching the set of one or more preferences associated with the first user with information associated with the pre-configured list of physical locations.

9. The method of claim 1, wherein generating the list of one or more physical locations further comprises:
　generating the list of one or more physical locations based upon a content of the set of one or more messages.

10. The method of claim 1, wherein generating the list of one or more physical locations comprises ranking the one or more physical locations based upon one or more ranking factors, the one or more ranking factors comprising at least one of:
　past selections of physical locations by the first user;
　distance information associated with each physical location in the list of one or more physical locations relative to a physical location of the first user;
　ease of access information associated with each physical location in the list of one or more physical locations; or
　safety information associated with each physical location in the list of one or more physical locations.

11. The method of claim 1, further comprising:
　receiving, by the computing system from the second device, a response indicating acceptance of the first physical location; and
　sending, to the first device, a message indicating acceptance of the first physical location by the second user.

12. The method of claim 11, further comprising:
　scheduling, by the computing system, a meeting between the first user and the second user at the first physical location.

13. The method of claim 1, further comprising:
　receiving, by the computing system from the second device, a response indicating rejection of the first physical location; and
　responsive to receiving the response:
　　generating a new list of one or more physical locations excluding the first physical location; and
　　　causing, by the computing system, the new list of one or more physical locations to be displayed to the first device for the first user to select a second physical location; or
　　　causing, by the computing system, the new list of one or more physical locations to be displayed to the second device for the second user to select the second physical location.

14. The method of claim 1, wherein generating the list of one or more physical locations further comprises:
　generating the list of one or more physical locations based upon at least one of:
　　a physical location of the second user; or
　　a set of one or more preferences of the second user specified with respect to the messaging platform.

15. A method comprising:
　receiving, by a computing system through a messaging platform, a request from a first user;
　creating, by the computing system in response to receiving the request, a data object associated with the request;
　accessing, by the computing system from one or more data stores associated with the messaging platform, information associated with the first user;
　accessing, by the computing system from the one or more data stores, a pre-configured list of physical locations, wherein the pre-configured list of physical locations is provided by the messaging platform;
　generating, by the computing system, a list of one or more physical locations suitable for in-person meeting, wherein:
　　the generating comprises selecting the one or more physical locations from the pre-configured list of physical locations based upon information associated with the first user and a relationship between the first user and a second user,
　　the relationship between the first user and the second user is determined based upon a social graph stored in a remote social networking system, the social graph identifying the relationship between the first user and the second user, and
　　the information associated with the first user comprises a set of one or more preferences of the first user specified with respect to the messaging platform and is extracted from a user profile associated with the messaging platform for the first user;
　communicating, by the computing system to a first device used by the first user, the list of one or more physical locations;
　receiving, at the computing system from the first device, information indicating selection of a first physical location from the list of one or more physical locations; and
　storing, by the computing system, an association between information indicative of the first physical location and the data object.

16. The method of claim 15, further comprising:
　causing, by the computing system, the information indicative of the first physical location to be displayed on a second device used by the second user for the second user to accept or reject the first physical location;
　receiving, by the computing system from the second device, a response indicating acceptance of the first physical location; and
　sending, to the first device, a message indicating acceptance of the first physical location by the second user.

17. The method of claim 15, further comprising:
　causing, by the computing system, information identifying two or more physical locations from the list of one or more physical locations to be displayed on a second device used by the second user, the two or more physical locations including the first physical location;
　receiving, by the computing system from the second device, a response indicating a selection of a second physical location from the two or more physical locations; and
　sending, to the first device, a message indicating selection of the second physical location by the second user.

18. A non-transitory computer-readable storage medium storing instructions executable by one or more processors, the instructions, when executed by the one or more processors, cause the one or more processors to perform operations including:
- monitoring a set of one or more messages exchanged between a first user and a second user via a messaging platform;
- detecting, based upon the monitoring, an intent of the first user to meet at a physical location;
- generating a list of one or more physical locations suitable for in-person meeting based on a relationship between the first user and the second user, wherein:
  - the generating comprises selecting the one or more physical locations from a pre-configured list of physical locations based upon information associated with the first user, the information associated with the first user comprising a set of one or more preferences of the first user specified with respect to the messaging platform and being extracted from a user profile associated with the messaging platform for the first user;
  - the relationship between the first user and the second user is determined based upon a social graph stored in a remote social networking system, the social graph identifying the relationship between the first user and the second user; and
  - the pre-configured list of physical locations is provided by a provider of the messaging platform;
- causing the list of one or more physical locations to be displayed on a first device used by the first user;
- receiving, from the first device, information indicating selection of a first physical location from the list of one or more physical locations; and
- causing information identifying the first physical location to be displayed on a second device used by a second user for the second user to accept or reject the first physical location.

* * * * *